US012634037B2

(12) United States Patent
Liu et al.

(10) Patent No.: US 12,634,037 B2
(45) Date of Patent: May 19, 2026

(54) SENDING METHOD, RECEIVING METHOD, APPARATUS, SYSTEM, DEVICE, AND STORAGE MEDIUM

(71) Applicant: HUAWEI TECHNOLOGIES CO., LTD., Shenzhen (CN)

(72) Inventors: Yongzhi Liu, Dongguan (CN); Yuchun Lu, Beijing (CN); Liang Li, Beijing (CN); Lin Ma, Shenzhen (CN); Xianwen Qiu, Dongguan (CN); Jianqiang Liu, Dongguan (CN); Li Ding, Shenzhen (CN); Chengmin Zhang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 34 days.

(21) Appl. No.: 18/750,192

(22) Filed: Jun. 21, 2024

(65) Prior Publication Data

US 2024/0364455 A1    Oct. 31, 2024

Related U.S. Application Data

(63) Continuation of application No. PCT/CN2022/130861, filed on Nov. 9, 2022.

(30) Foreign Application Priority Data

Dec. 22, 2021    (CN) .......................... 202111578236.X

(51) Int. Cl.
*H04L 1/00* (2006.01)
*H04L 1/1607* (2023.01)

(52) U.S. Cl.
CPC .......... *H04L 1/0061* (2013.01); *H04L 1/0057* (2013.01); *H04L 1/0063* (2013.01); *H04L 1/1642* (2013.01)

(58) Field of Classification Search
CPC ... H04L 1/0061; H04L 1/0057; H04L 1/0063; H04L 1/1642; H04L 1/0043; H04L 1/0052; H04L 1/004; H04L 1/0056
See application file for complete search history.

(56) References Cited

U.S. PATENT DOCUMENTS 11,451,246 B1 *    9/2022    Zhu ................... H03M 13/1575
2016/0173232 A1 *    6/2016    Mallik .............. H03M 13/2966
                                                                       714/800

(Continued)

FOREIGN PATENT DOCUMENTS

CN        105634504 A        6/2016
CN        107370488 A        11/2017
CN        111628780 A        9/2020

OTHER PUBLICATIONS

Sharma, "PCIe 6.0 Specification: The Interconnect for I/O Needs of the Future", PCI-SIG Educational Webinar Series, Jun. 4, 2020, 24 pages.

*Primary Examiner* — Cynthia Britt

(74) *Attorney, Agent, or Firm* — Maier & Maier, PLLC

(57)        ABSTRACT

A sending method, a receiving method, an apparatus, a system, a device, and a storage medium. The receiving method includes: obtaining an encoded data block, where the encoded data block includes a plurality of data blocks, a plurality of first parity bits, and an FEC parity bit, the plurality of first parity bits are in one-to-one correspondence with the plurality of data blocks, and the FEC parity bit corresponds to the plurality of data blocks; and then checking the corresponding data blocks based on the plurality of first parity bits and/or the FEC parity bit, to obtain a decoding result of the encoded data block.

24 Claims, 16 Drawing Sheets

(56) References Cited

U.S. PATENT DOCUMENTS

| | | | |
|---|---|---|---|
| 2017/0012738 A1 | 1/2017 | Mantiply et al. | |
| 2018/0115326 A1 | 4/2018 | Aharony | |
| 2022/0052712 A1* | 2/2022 | Pan | H03M 13/2942 |
| 2022/0149869 A1* | 5/2022 | Jeong | H03M 13/611 |
| 2023/0327806 A1* | 10/2023 | Riani | H04L 1/0046 |
| | | | 714/776 |
| 2024/0039556 A1* | 2/2024 | Huang | H04L 1/0071 |

* cited by examiner

Sending apparatus 100

Sending apparatus 100

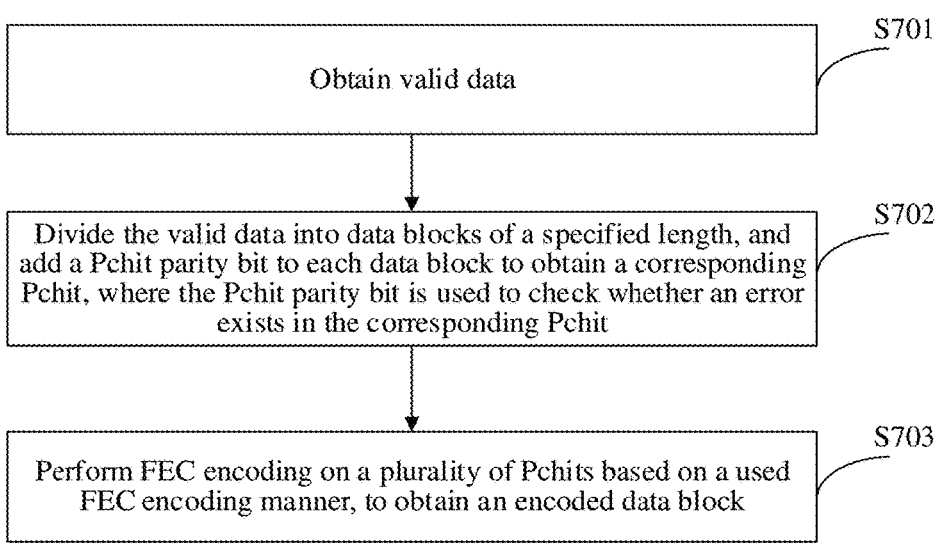

S701

Obtain valid data

S702

Divide the valid data into data blocks of a specified length, and add a Pchit parity bit to each data block to obtain a corresponding Pchit, where the Pchit parity bit is used to check whether an error exists in the corresponding Pchit

S703

Perform FEC encoding on a plurality of Pchits based on a used FEC encoding manner, to obtain an encoded data block

FIG. 7

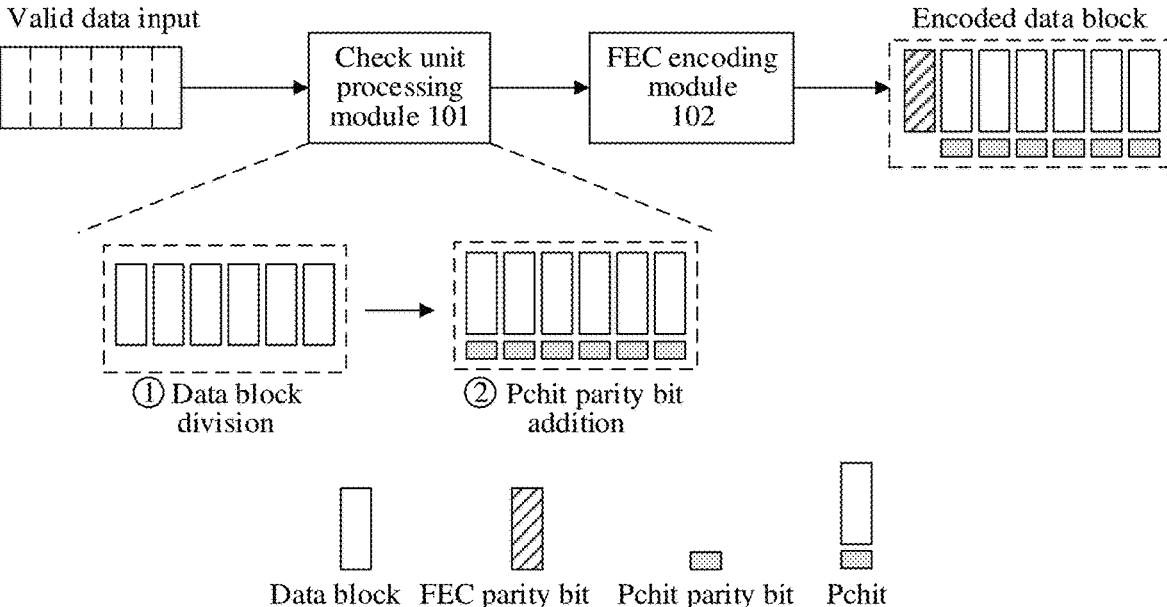

Valid data input

Check unit processing module 101

FEC encoding module 102

Encoded data block

① Data block division

② Pchit parity bit addition

Data block    FEC parity bit    Pchit parity bit    Pchit

FIG. 8

520 bits

Data block 0

Data block 1

⋮

Data block 7

Data block 8

Data block 9

5200-bit valid data
(10 × 520 bits)

| | 520 bits | 24 bits |
|---|---|---|
| Pchit 0 | Data block 0 | BCH parity bit 0 |
| Pchit 1 | Data block 1 | BCH parity bit 1 |
| ⋮ | ⋮ | ⋮ |
| Pchit 7 | Data block 7 | BCH parity bit 7 |
| Pchit 8 | Data block 8 | BCH parity bit 8 |
| Pchit 9 | Data block 9 | BCH parity bit 9 |

Total: 10 × 544 bits = 5440 bits

X-bit

Data block 0

Data block 1

⋮

Data block 7

Data block 8

Data block 9

(10 × X)-bit valid data

|  | X-bit | Y-bit | Z-bit |
|---|---|---|---|
| Pchit 0 | Data block 0 | BCH parity bit 0 | CRC parity bit 0 |
| Pchit 1 | Data block 1 | BCH parity bit 1 | CRC parity bit 1 |
| ⋮ | ⋮ | ⋮ | ⋮ |
| Pchit 7 | Data block 7 | BCH parity bit 7 | CRC parity bit 7 |
| Pchit 8 | Data block 8 | BCH parity bit 8 | CRC parity bit 8 |
| Pchit 9 | Data block 9 | BCH parity bit 9 | CRC parity bit 9 |

Total: $10 \times (X + Y + Z)$ bits

Q × 257 bits

Data block 0

Data block 1

⋮

Data block (N – 3)

Data block (N – 2)

Data block (N – 1)

5140-bit valid data
(N × Q × 257 bits)

| | Q × 257 bits | M-bit |
|---|---|---|
| Pchit 0 | Data block 0 | Pchit parity bit 0 |
| Pchit 1 | Data block 1 | Pchit parity bit 1 |
| ⋮ | ⋮ | ⋮ |
| Pchit (N – 3) | Data block (N – 3) | Pchit parity bit (N – 3) |
| Pchit (N – 2) | Data block (N – 2) | Pchit parity bit (N – 2) |
| Pchit (N – 1) | Data block (N – 1) | Pchit parity bit (N – 1) |

N × Q × 257 bits = 5140 bits

RS codeword

|  | 1285 bits | 35 bits |
|---|---|---|
| Pchit 0 | Data block 0 | eBCH parity bit 0 |
| Pchit 1 | Data block 1 | eBCH parity bit 1 |
| ⋮ | ⋮ | ⋮ |
| Pchit 4 | Data block 4 | eBCH parity bit 4 |
| Pchit 5 | Data block 5 | eBCH parity bit 5 |
| Pchit 6 | Data block 6 | eBCH parity bit 6 |

$7 \times 1320 \text{ bits} = 9240 \text{ bits}$

| | X-bit | Y-bit | Z-bit |
|---|---|---|---|
| Pchit 0 | Data block 0 | BCH parity bit 0 | CRC parity bit 0 |
| Pchit 1 | Data block 1 | BCH parity bit 1 | CRC parity bit 1 |
| ⋮ | ⋮ | ⋮ | ⋮ |
| Pchit 7 | Data block 7 | BCH parity bit 7 | CRC parity bit 7 |
| Pchit 8 | Data block 8 | BCH parity bit 8 | CRC parity bit 8 |
| Pchit 9 | Data block 9 | BCH parity bit 9 | CRC parity bit 9 |
| | FEC parity bit | | |

320 bits

Encoded data block

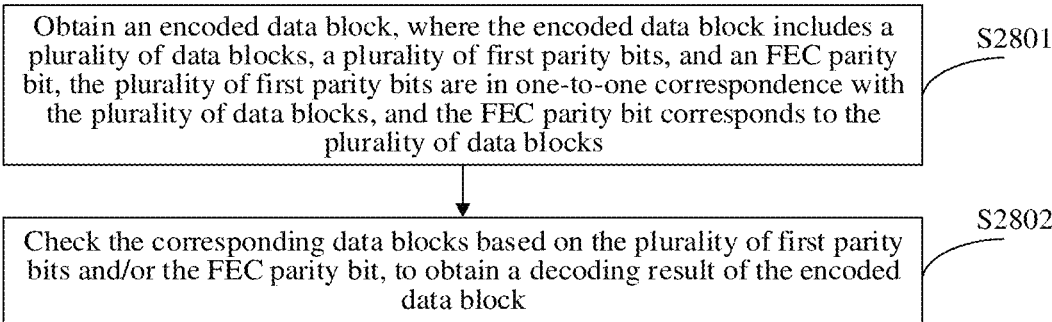

Obtain an encoded data block, where the encoded data block includes a plurality of data blocks, a plurality of first parity bits, and an FEC parity bit, the plurality of first parity bits are in one-to-one correspondence with the plurality of data blocks, and the FEC parity bit corresponds to the plurality of data blocks    S2801

Check the corresponding data blocks based on the plurality of first parity bits and/or the FEC parity bit, to obtain a decoding result of the encoded data block    S2802

FIG. 28

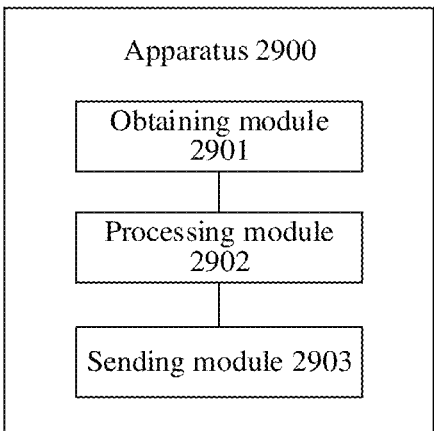

Apparatus 2900

Obtaining module 2901

Processing module 2902

Sending module 2903

FIG. 29

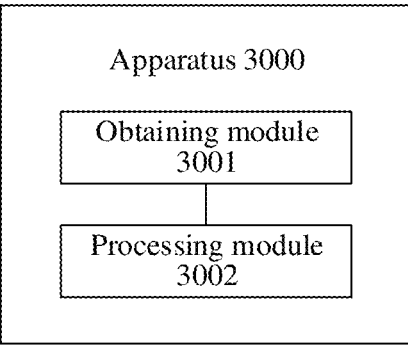

Apparatus 3000

Obtaining module 3001

Processing module 3002

SENDING METHOD, RECEIVING METHOD, APPARATUS, SYSTEM, DEVICE, AND STORAGE MEDIUM

CROSS-REFERENCE TO RELATED APPLICATIONS

This application is a continuation of International Application No. PCT/CN2022/130861, filed on Nov. 9, 2022, which claims priority to Chinese Patent Application No. 202111578236.X, filed on Dec. 22, 2021. The disclosures of the aforementioned applications are hereby incorporated by reference in their entireties.

TECHNICAL FIELD

The embodiments relate to the field of communication technologies, and to a sending method, a receiving method, an apparatus, a system, a device, and a storage medium.

BACKGROUND

Currently, rates of various communication links are iterated rapidly, but link quality gradually deteriorates with the increase of the link rate. To resolve a problem such as an increase in a bit error rate caused by the link quality deterioration, forward error correction (FEC) becomes a necessary enabling technology.

For example, the FEC technology is introduced into both an existing Ethernet standard and peripheral component interconnect express (PCIe) 6.0, to provide a bit error correction capability. However, a problem such as an increase in a latency caused by FEC decoding occurs correspondingly. In this case, it is difficult to meet latency requirements of application scenarios such as computing and storage.

Therefore, it is necessary to provide a solution that can meet a low latency and high-gain FEC at the same time.

SUMMARY

To ensure a low latency and a high gain, embodiments provide a sending method, a receiving method, an apparatus, a system, a device, and a storage medium, so that an error correction capability of a high-gain FEC code can be retained, and impact of high-gain FEC on the latency can be reduced.

According to a first aspect, the embodiments provide a sending method. The method includes: obtaining a plurality of data blocks; separately generating a plurality of first parity bits based on the plurality of data blocks, where the plurality of first parity bits are in one-to-one correspondence with the plurality of data blocks, and generating a forward error correction FEC parity bit based on the plurality of data blocks, to obtain an encoded data block; and sending the encoded data block.

It can be understood that, in this embodiment, one corresponding first parity bit is added to each data block, to provide a error detection capability. Therefore, independent check can be separately performed on the corresponding data blocks by using the plurality of first parity bits, to determine whether an error exists in each data block. In this way, an error in the encoded data block can be predicted. In this embodiment, the FEC parity bit (where the FEC parity bit may be generated by performing FEC encoding on the plurality of data blocks) is further added to the plurality of data blocks, to provide a error correction capability, so that the error in the encoded data block (or in the plurality of data blocks in the encoded data block) can be corrected by using the FEC parity bit.

According to the sending method in this embodiment, two different processing granularities may be used for error detection and error correction, and an inclusion relationship exists between the two processing granularities. One data block is used as a processing granularity for the error detection. An entire encoded data block (or a plurality of data blocks) is used as a processing granularity for the error correction, where the encoded data block includes the plurality of data blocks. Therefore, a decoding manner corresponding to the encoded data block becomes very flexible. This helps reduce impact of FEC decoding on a latency and power consumption, and helps implement a low latency and high-gain FEC.

Based on the first aspect, in a possible embodiment, the separately generating a plurality of first parity bits based on the plurality of data blocks includes: separately encoding data of the plurality of data blocks in one or more encoding manners, to generate the plurality of first parity bits.

In other words, a first parity bit corresponding to each data block may be generated by performing one or more types of encoding on data of the data block. Therefore, a design of the first parity bit becomes very flexible. This helps control a length of the first parity bit, reduces bandwidth usage, also makes a design of a length of the data block more flexible, further helps improve reliability of the first parity bit, and reduces a probability of missed error detection.

Based on the first aspect, in a possible embodiment, the generating an FEC parity bit based on the plurality of data blocks includes: generating the FEC parity bit based on the plurality of data blocks and the plurality of first parity bits.

In other words, in addition to the plurality of data blocks, the first parity bits corresponding to the plurality of data blocks may also participate in the FEC encoding as a part of an FEC payload, to generate the FEC parity bit. Therefore, the FEC parity bit can not only find and correct an error in the plurality of data blocks in the encoded data block, but also find and correct an error in the first parity bit.

According to a second aspect, an embodiment provides a receiving method. The method includes: obtaining an encoded data block, where the encoded data block includes a plurality of data blocks, a plurality of first parity bits, and an FEC parity bit, the plurality of first parity bits are in one-to-one correspondence with the plurality of data blocks, and the FEC parity bit corresponds to the plurality of data blocks; and checking the corresponding data blocks based on the plurality of first parity bits and/or the FEC parity bit, to obtain a decoding result of the encoded data block.

It can be understood that the plurality of first parity bits in the encoded data block are in one-to-one correspondence with the plurality of data blocks, and the FEC parity bit corresponds to the plurality of data blocks (or corresponds to the entire encoded data block). Therefore, the decoding result of the encoded data block may be obtained by separately checking the corresponding data blocks by using the plurality of first parity bits, or may be obtained by checking the plurality of data blocks by using the FEC parity bit. It is clear that a decoding manner corresponding to the encoded data block may be very flexible. This helps reduce impact of FEC decoding on a latency and power consumption, and helps implement a low latency and high-gain FEC.

Based on the second aspect, in a possible embodiment, the checking the corresponding data blocks based on the plurality of first parity bits and/or the FEC parity bit, to obtain a decoding result of the encoded data block includes:

separately checking whether an error exists in the corresponding data blocks based on the plurality of first parity bits; and performing FEC decoding on the plurality of data blocks based on the FEC parity bit when an error is detected in the plurality of data blocks, to obtain the decoding result of the encoded data block.

It can be understood that, in this embodiment, the corresponding data blocks are separately checked based on the plurality of first parity bits, to separately determine whether an error exists in each data block. In other words, error detection is performed by using the data block as a processing granularity, and each data block in the encoded data block may be independently checked, to predict an error in the encoded data block. When an error is detected in the plurality of data blocks (in other words, an error is detected in at least one of the plurality of data blocks), the FEC decoding may be performed on the plurality of data blocks based on the FEC parity bit, to obtain the decoding result of the encoded data block. It may be understood that, the start of the FEC decoding and introduction of an FEC decoding latency are needed only when an error exists. Therefore, impact of the FEC decoding on a latency and power consumption can be reduced, and this helps implement a low latency and high-gain FEC.

Based on the second aspect, in a possible embodiment, the method further includes: using the plurality of data blocks as the decoding result of the encoded data block when no error is detected in the plurality of data blocks.

In other words, when no error is detected in each of the plurality of data blocks, the FEC decoding does not need to be started, and data of the plurality of data blocks may be directly used as the decoding result of the encoded data block. This can reduce power consumption and reduce the impact of the FEC decoding on the latency.

Based on the second aspect, in a possible embodiment, the performing FEC decoding on the plurality of data blocks based on the FEC parity bit when an error is detected in the plurality of data blocks, to obtain the decoding result of the encoded data block includes: using a first data block as a decoding result of the first data block when no error is detected in the first data block, where the first data block is one of the plurality of data blocks; performing FEC decoding on the plurality of data blocks based on the FEC parity bit when an error is detected in a second data block, to obtain FEC decoded data, and using data corresponding to the second data block in the FEC decoded data as a decoding result of the second data block, where the second data block is one of the plurality of data blocks; and using decoding results of the plurality of data blocks as the decoding result of the encoded data block.

It may be understood that the error detection on the plurality of data blocks in the encoded data block is separately performed based on the first parity bits corresponding to the plurality of data blocks. When no error is detected in a data block, the data block may be directly used as a decoding result of the data block. When an error is detected in a data block, an FEC function needs to be started, and the FEC decoding is performed on the plurality of data blocks (or the entire encoded data block) by using the FEC parity bit, to obtain the FEC decoded data. It should be understood that data corresponding to the data block in the FEC decoded data is data obtained after the error in the data block is corrected.

It is clear that the error detection is performed by using the data block as the processing granularity, and the encoded data block includes the plurality of data blocks. Therefore, each data block in the encoded data block may be independently checked, to predict the error in the encoded data block. However, error correction is performed by using a plurality of data blocks as a processing granularity, and errors existing in the plurality of data blocks (including errors existing in each data block) may be corrected at a time. Then, the decoding results corresponding to the plurality of data blocks are combined as the decoding result of the encoded data block.

Based on the second aspect, in a possible embodiment, the plurality of data blocks have a sequence. The separately checking whether an error exists in the corresponding data blocks based on the plurality of first parity bits includes: sequentially checking whether an error exists in the corresponding data blocks based on the plurality of first parity bits. The using data corresponding to the second data block in the FEC decoded data as a decoding result of the second data block includes: respectively using the data corresponding to the second data block and data corresponding to another data block following the second data block in the FEC decoded data as the decoding result of the second data block and a decoding result of the another data block following the second data block.

In other words, the plurality of data blocks in the encoded data block may have a sequence, and the check on the plurality of data blocks based on the plurality of first parity bits may be sequentially performed. When no error is detected in a data block, the data block is directly used as a decoding result of the data block.

When an error is detected in any one of the plurality of data blocks, the FEC function needs to be started, and the FEC decoding is performed on the plurality of data blocks based on the FEC parity bit, to obtain the FEC decoded data. Then, data corresponding to the data block in which the error is detected and data corresponding to another data block following the data block in the FEC decoded data are respectively used as a decoding result of the data block and a decoding result of the another data block following the data block. In this case, a check result of the another data block following the data block can be ignored (regardless of whether an error can be detected in the another data block following the data block), and the check on the another data block following the data block may even be stopped, to reduce energy consumption. Because a decoding result corresponding to each data block is determined, the respective decoding results of the plurality of data blocks may be directly combined as the decoding result of the entire encoded data block.

Based on the second aspect, in a possible embodiment, the checking the corresponding data blocks based on the plurality of first parity bits and/or the FEC parity bit, to obtain a decoding result of the encoded data block includes: separately checking whether an error exists in the corresponding data blocks based on the plurality of first parity bits; performing FEC decoding on the plurality of data blocks based on the FEC parity bit, to obtain FEC decoded data; and obtaining the decoding result of the encoded data block based on the FEC decoded data when an error is detected in the plurality of data blocks.

It can be understood that, in this embodiment, the corresponding data blocks may be separately checked based on the plurality of first parity bits, to determine whether an error exists in the plurality of data blocks. In addition, the FEC decoding is performed on the plurality of data blocks based on the FEC parity bit, to obtain the FEC decoded data. In other words, error detection is performed by using a data block as a processing granularity, and the encoded data block includes the plurality of data blocks. Therefore, each data block in the encoded data block may be independently checked, to predict an error in the encoded data block. However, error correction is performed by using a plurality of data blocks as a processing granularity, and errors of the plurality of data blocks (including errors existing in each data block) may be corrected at a time. Obviously, the error detection and the error correction use two different processing granularities, and the two processing granularities have an inclusion relationship, in other words, the encoded data block includes the plurality of data blocks.

It should be understood that if an error exists in a data block, data corresponding to the data block in the FEC decoded data is data obtained after the error correction is performed on the data block. If no error exists in a data block, data corresponding to the data block in the FEC decoded data is not corrected, and is the same as data of the data block. When an error is detected in the plurality of data blocks (in other words, an error is detected in at least one of the plurality of data blocks), the decoding result of the encoded data block may be obtained based on the FEC decoded data.

It may be understood that, the use of the FEC decoded data and introduction of an FEC decoding latency are needed only when an error exists. Therefore, impact of the FEC decoding on a latency can be reduced, and this helps implement a low latency and a high gain.

Based on the second aspect, in a possible embodiment, the separately checking, based on the plurality of first parity bits, whether an error exists in the corresponding data blocks, and the performing FEC decoding on the plurality of data blocks based on the FEC parity bit, to obtain FEC decoded data are performed in parallel.

In other words, the error detection using the data block as the processing granularity and the error correction using the plurality of data blocks as the processing granularity may be performed in parallel. This helps reduce the impact of the FEC decoding on the latency.

Based on the second aspect, in a possible embodiment, the checking the corresponding data blocks based on the plurality of first parity bits and/or the FEC parity bit, to obtain a decoding result of the encoded data block further includes: using the plurality of data blocks as the decoding result of the encoded data block when no error is detected in the plurality of data blocks.

In other words, when no error is detected in each of the plurality of data blocks, there is no need to wait for the FEC decoded data obtained through the FEC decoding, and data of the plurality of data blocks may be directly used as the decoding result of the encoded data block. In this way, an FEC decoding latency in an error-free case can be omitted, so that a problem that the high-gain FEC has a great impact on the latency is resolved, and a requirement of a low-latency scenario is met.

Based on the second aspect, in a possible embodiment, the obtaining the decoding result of the encoded data block based on the FEC decoded data when an error is detected in the plurality of data blocks includes: using a first data block as a decoding result of the first data block when no error is detected in the first data block, where the first data block is one of the plurality of data blocks; using data corresponding to a second data block in the FEC decoded data as a decoding result of the second data block when an error is detected in the second data block, where the second data block is one of the plurality of data blocks; and using decoding results of the plurality of data blocks as the decoding result of the encoded data block.

It can be understood that, when no error is detected in a data block based on a first parity bit corresponding to the data block, data of the data block is directly used as a decoding result of the data block. When an error is detected in a data block based on a first parity bit corresponding to the data block, the FEC decoded data obtained by performing FEC decoding based on the FEC parity bit needs to be used, and data corresponding to the data block in the FEC decoded data is used as a decoding result of the data block. Then, the decoding results corresponding to the data blocks in the encoded data block are combined as the decoding result of the encoded data block.

It may be understood that, the use of the FEC decoded data and the introduction of the FEC decoding latency are needed only when an error exists in at least one data block in the encoded data block. Therefore, impact of an FEC frame receiving latency and the FEC decoding latency on an interface latency is reduced, and the fixed FEC decoding latency is changed to a dynamic latency jitter. This can eliminate a latency disadvantage of the high-gain FEC.

Based on the second aspect, in a possible embodiment, the plurality of data blocks have a sequence. The separately checking whether an error exists in the corresponding data blocks based on the plurality of first parity bits includes: sequentially checking whether an error exists in the corresponding data blocks based on the plurality of first parity bits. The using data corresponding to the second data block in the FEC decoded data as a decoding result of the second data block includes: respectively using the data corresponding to the second data block and data corresponding to another data block following the second data block in the FEC decoded data as the decoding result of the second data block and a decoding result of the another data block following the second data block.

It can be understood that the plurality of data blocks in the encoded data block may have a sequence, and the check on the plurality of data blocks based on the plurality of first parity bits may be sequentially performed, and the check (such as the error detection) can be preferentially performed on a data block in an earlier sequence.

When no error is detected in a data block, data of the data block is directly used as a decoding result of the data block.

When an error is detected in a data block, data corresponding to the data block and data corresponding to another data block following the data block in the FEC decoded data are respectively used as a decoding result of the data block and a decoding result of the another data block following the data block. Then, an error detection result of the another data block following the data block may be ignored, the error detection on the another data block following the data block may even be stopped, and the decoding results of all the data blocks are directly combined as the decoding result of the encoded data block. This implements the error correction, ensures an output bit error rate, and helps reduce the latency.

According to a third aspect, an embodiment provides an apparatus. The apparatus includes an obtaining module, configured to obtain a plurality of data blocks; a processing module, configured to separately generate a plurality of first parity bits based on the plurality of data blocks, where the plurality of first parity bits are in one-to-one correspondence with the plurality of data blocks, and generate a forward error correction FEC parity bit based on the plurality of data blocks, to obtain an encoded data block; and a sending module, configured to send the encoded data block.

In a possible embodiment, the separately generating a plurality of first parity bits based on the plurality of data blocks includes: separately encoding data of the plurality of data blocks in one or more encoding manners, to generate the plurality of first parity bits.

In a possible embodiment, the generating an FEC parity bit based on the plurality of data blocks includes: generating the FEC parity bit based on the plurality of data blocks and the plurality of first parity bits.

According to a fourth aspect, an embodiment provides another apparatus. The apparatus includes: an obtaining module, configured to obtain an encoded data block, where the encoded data block includes a plurality of data blocks, a plurality of first parity bits, and an FEC parity bit, the plurality of first parity bits are in one-to-one correspondence with the plurality of data blocks, and the FEC parity bit corresponds to the plurality of data blocks; and a processing module, configured to check the corresponding data blocks based on the plurality of first parity bits and/or the FEC parity bit, to obtain a decoding result of the encoded data block.

In a possible embodiment, the checking the corresponding data blocks based on the plurality of first parity bits and/or the FEC parity bit, to obtain a decoding result of the encoded data block includes: separately checking whether an error exists in the corresponding data blocks based on the plurality of first parity bits; and performing FEC decoding on the plurality of data blocks based on the FEC parity bit when an error is detected in the plurality of data blocks, to obtain the decoding result of the encoded data block.

In a possible embodiment, the method further includes: using the plurality of data blocks as the decoding result of the encoded data block when no error is detected in the plurality of data blocks.

In a possible embodiment, the performing FEC decoding on the plurality of data blocks based on the FEC parity bit when an error is detected in the plurality of data blocks, to obtain the decoding result of the encoded data block includes: using a first data block as a decoding result of the first data block when no error is detected in the first data block, where the first data block is one of the plurality of data blocks; performing FEC decoding on the plurality of data blocks based on the FEC parity bit when an error is detected in a second data block, to obtain FEC decoded data, and using data corresponding to the second data block in the FEC decoded data as a decoding result of the second data block, where the second data block is one of the plurality of data blocks; and using decoding results of the plurality of data blocks as the decoding result of the encoded data block.

In a possible embodiment, the plurality of data blocks have a sequence. The separately checking whether an error exists in the corresponding data blocks based on the plurality of first parity bits includes: sequentially checking whether an error exists in the corresponding data blocks based on the plurality of first parity bits. The using data corresponding to the second data block in the FEC decoded data as a decoding result of the second data block includes: respectively using the data corresponding to the second data block and data corresponding to another data block following the second data block in the FEC decoded data as the decoding result of the second data block and a decoding result of the another data block following the second data block.

In a possible embodiment, the checking the corresponding data blocks based on the plurality of first parity bits and/or the FEC parity bit, to obtain a decoding result of the encoded data block includes: separately checking whether an error exists in the corresponding data blocks based on the plurality of first parity bits; performing FEC decoding on the plurality of data blocks based on the FEC parity bit, to obtain FEC decoded data; and obtaining the decoding result of the encoded data block based on the FEC decoded data when an error is detected in the plurality of data blocks.

In a possible embodiment, the two actions of the separately checking, based on the plurality of first parity bits, whether an error exists in the corresponding data blocks, and the performing FEC decoding on the plurality of data blocks based on the FEC parity bit, to obtain FEC decoded data are performed in parallel.

In a possible embodiment, the checking the corresponding data blocks based on the plurality of first parity bits and/or the FEC parity bit, to obtain a decoding result of the encoded data block further includes: using the plurality of data blocks as the decoding result of the encoded data block when no error is detected in the plurality of data blocks.

In a possible embodiment, the obtaining the decoding result of the encoded data block based on the FEC decoded data when an error is detected in the plurality of data blocks includes: using a first data block as a decoding result of the first data block when no error is detected in the first data block, where the first data block is one of the plurality of data blocks; using data corresponding to a second data block in the FEC decoded data as a decoding result of the second data block when an error is detected in the second data block, where the second data block is one of the plurality of data blocks; and using decoding results of the plurality of data blocks as the decoding result of the encoded data block.

In a possible embodiment, the plurality of data blocks have a sequence. The separately checking whether an error exists in the corresponding data blocks based on the plurality of first parity bits includes: sequentially checking whether an error exists in the corresponding data blocks based on the plurality of first parity bits. The using data corresponding to the second data block in the FEC decoded data as a decoding result of the second data block includes: respectively using the data corresponding to the second data block and data corresponding to another data block following the second data block in the FEC decoded data as the decoding result of the second data block and a decoding result of the another data block following the second data block.

According to a fifth aspect, an embodiment provides a system, including the apparatus in any embodiment of the third aspect and the apparatus in any embodiment of the fourth aspect.

According to a sixth aspect, an embodiment provides a device, including a processor and a memory. The processor and the memory may be connected to each other through a bus, or may be integrated together. The processor is configured to read program code stored in the memory, to enable the device to perform the method in any embodiment of the first aspect or the second aspect.

According to a seventh aspect, an embodiment provides a non-transitory computer-readable storage medium. The non-transitory computer-readable storage medium is configured to store implementation code of the method in any embodiment of the first aspect or the second aspect.

According to an eighth aspect, an embodiment provides a computer program (product). The computer program (product) includes program instructions, and when the computer program product is executed by a computer, the computer is configured to perform the method in any embodiment of the first aspect or the second aspect.

According to a ninth aspect, an embodiment provides a chip. The chip is configured to perform the method in any embodiment of the first aspect or the second aspect.

Thus, in this embodiment, at a transmitting end, one corresponding first parity bit is separately generated for each of a plurality of data blocks, and one corresponding FEC parity bit is generated for the plurality of data blocks. In this way, a receiving end can separately check, by using the plurality of first parity bits, whether an error exists in the corresponding data blocks, to predict an error in an encoded data block. In addition, the receiving end can correct an error existing in the plurality of data blocks by using the FEC parity bit. Therefore, the receiving end may flexibly design a decoding manner of the encoded data block. This helps reduce impact of FEC decoding on a latency and power consumption, and helps implement a low latency and a high gain.

Correspondingly, in this embodiment, at the receiving end, a decoding result of the encoded data block may be obtained based on the plurality of first parity bits and/or the FEC parity bit in the encoded data block. There may be two types of solutions: starting FEC on demand and parallel error detection and correction.

In the solution of starting FEC on demand, whether an error exists in the corresponding data blocks is first checked based on the plurality of first parity bits. If no error is detected in each of the plurality of data blocks, data of the plurality of data blocks may be directly used as the decoding result of the encoded data block. If an error is detected in the plurality of data blocks (in other words, an error is detected in at least one of the plurality of data blocks), an FEC function needs to be started, and the FEC decoding is performed on the plurality of data blocks based on the FEC parity bit, to obtain FEC decoded data. For a data block in which no error is detected, data of the data block may be directly used as a decoding result of the data block. For a data block in which an error is detected, data corresponding to the data block in the FEC decoded data is used as a decoding result of the data block. Further, decoding results of all the data blocks are combined as the decoding result of the encoded data block. Additionally, a sequence of the plurality of data blocks may be further considered, and whether an error exists in each data block is checked based on the sequence. The FEC decoding is started to obtain the FEC decoded data only when an error exists in a data block. Then, data corresponding to the data block and data corresponding to another data block following the data block in the FEC decoded data are respectively used as a decoding result of the data block and a decoding result of the another data block following the data block. Therefore, a check result of the another data block following the data block may be ignored, and the check on the another data block following the data block in the encoded data block may even be stopped. It may be understood that, the start of the FEC decoding and introduction of an FEC decoding latency are needed only when an error exists. Therefore, the impact of the FEC decoding on the latency and the power consumption can be reduced, and this helps implement the low latency and the high gain.

In the solution of parallel error detection and correction, whether an error exists in the corresponding data blocks may be separately checked based on the plurality of data blocks, and the FEC decoding is performed on the plurality of data blocks based on the FEC parity bit, to obtain FEC decoded data. The foregoing error detection and error correction actions may be performed in parallel. When no error is detected in the plurality of data blocks, there is no need to wait for/use the FEC decoded data, and data of the plurality of data blocks is directly used as the decoding result of the encoded data block. When an error is detected in the plurality of data blocks, the FEC decoded data needs to be used. For a data block in which no error is detected, data of the data block may be directly used as a decoding result of the data block. For a data block in which an error is detected, data corresponding to the data block in the FEC decoded data is used as a decoding result of the data block. Then, decoding results of all the data blocks are combined as the decoding result of the encoded data block. Further, a sequence of the plurality of data blocks may also be considered herein, and the check is sequentially performed. When an error is detected in a data block, data corresponding to the data block and data corresponding to another data block following the data block in the FEC decoded data are respectively used as a decoding result of the data block and a decoding result of the another data block following the data block. Therefore, a check result of the another data block following the data block may be ignored, and the check on the another data block following the data block in the encoded data block may even be stopped. It may be understood that, the use of the FEC decoded data and introduction of an FEC decoding latency are needed only when an error exists. Therefore, the impact of the FEC decoding on the latency can be reduced, and this helps implement the low latency and the high gain. In addition, an error correction capability of a high-gain FEC code is retained, and this helps control an output bit error rate.

BRIEF DESCRIPTION OF DRAWINGS

To describe the solutions in the embodiments more clearly, the following briefly describes the accompanying drawings that are used in describing embodiments.

FIG. 7 is a schematic flowchart of a sending method according to an embodiment;

FIG. 8 is a schematic diagram of a processing procedure of a sending apparatus according to an embodiment;

FIG. 28 is a flowchart of a receiving method according to an embodiment of this application;

FIG. 29 is a schematic diagram of a structure of an apparatus according to an embodiment;

FIG. 30 is a schematic diagram of a structure of another apparatus according to an embodiment;

DETAILED DESCRIPTION OF EMBODIMENTS

For ease of understanding the solutions in the embodiments, the following briefly describes some terms and concepts.

1. Forward Error Correction (FEC):

FEC is an error control manner, and refers to a technology. In the technology, before a signal is sent to a transmission channel, the signal is encoded according to a specific algorithm and a redundant code having a feature of the signal is added. At a receiving end, a received signal is decoded according to a corresponding algorithm, to find and correct an error code generated during transmission. An FEC code gain is an indicator for measuring an error correction capability of an FEC code.

2. Reed-Solomon (RS) Code:

An RS code is a forward error correction code, and a parameter representation manner of the RS code can be RS (n, k, t, m), RS (n, k, m), or RS (n, k). Herein, n represents a total length of the RS code, k represents a length of a payload (payload) in the RS code, t represents an error correction capability of the RS code, the three parameters n, k, and t each use a symbol as a unit, and m represents a quantity of bits (bit) included in each symbol. An FEC policy implemented by using the RS code is also referred to as RS-FEC.

The following describes a communication system in embodiments.

Figure 1:
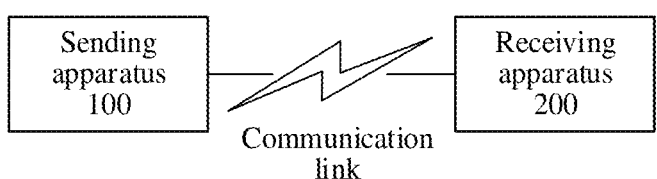
FIG. 1 is a schematic diagram of an architecture of a communication system according to an embodiment.

FIG. 1 is a schematic diagram of an architecture of a communication system according to an embodiment. The communication system includes a sending apparatus 100 and a receiving apparatus 200, and the sending apparatus 100 and the receiving apparatus 200 are connected through a communication link. The communication link may be a PCIe bus, an Ethernet cable, or the like. This is not limited.

The sending apparatus 100 is configured to encode valid data (or to-be-FEC-encoded data) to obtain an encoded data block, and then send the encoded data block to the receiving apparatus 200.

The receiving apparatus 200 is configured to decode the received encoded data block, to obtain a decoding result (in other words, restore the original valid data) of the encoded data block.

The sending apparatus 100 and the receiving apparatus 200 may separately be a processor, an accelerator, a memory, an input/output (I/O) device, a communication chip, a network connection device, a computing device, or the like. This is not limited.

It should be noted that, in addition to a corresponding physical medium, for example, an optical fiber, a twisted pair, or a coaxial cable, the communication link in FIG. 1 may further include e a serial-to-parallel converter, a modulator, a demodulator, an optical-to-electrical/electrical-to-optical converter, and the like (where these components/modules are omitted in the figure), so that the encoded data block can be converted into a transmission signal suitable for the physical medium. In other words, the encoded data block of the sending apparatus 100 may not be directly transmitted to the receiving apparatus 200, and may further need to be converted into a proper transmission signal before being transmitted. Correspondingly, the receiving apparatus 200 needs to restore the encoded data block from the transmission signal, and then decodes the encoded data block.

The following separately describes the sending apparatus 100 and the receiving apparatus 200 in detail.

Figure 2:
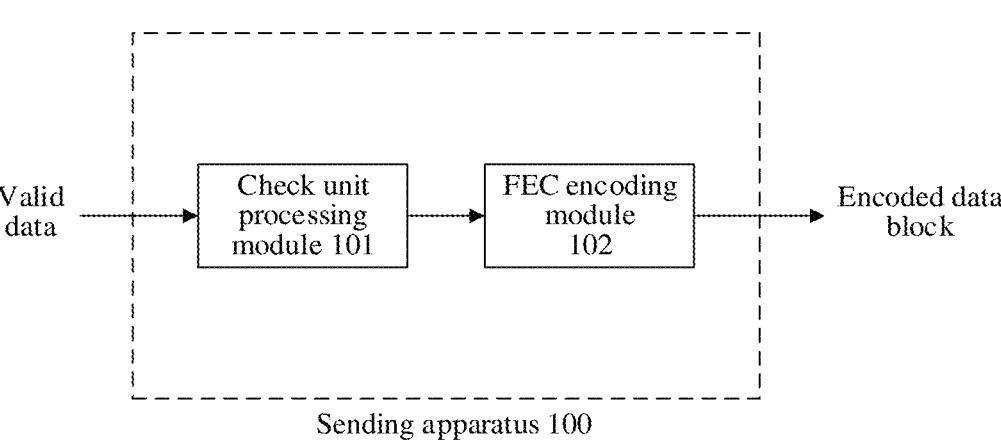
FIG. 2 is a schematic diagram of a structure of a sending apparatus according to an embodiment.

(1) In an embodiment, as shown in FIG. 2, the sending apparatus 100 includes a check unit processing module 101 and an FEC encoding module 102.

The check unit processing module 101 is configured to divide input data of the check unit processing module 101 into data blocks of a specified length, and generate (or add or insert) a corresponding Pchit parity bit for each data block. One data block and a Pchit parity bit corresponding to the data block form a physical check unit (Pchit), and the Pchit parity bit is used to determine whether an error exists in the Pchit.

The FEC encoding module 102 is configured to perform FEC encoding.

In a possible embodiment, as shown in FIG. 2, the check unit processing module 101 is located before the FEC encoding module 102, in other words, an output of the check unit processing module 101 is used as an input of the FEC encoding module 102. For example, valid data is first input to the check unit processing module 101. The check unit processing module 101 divides the valid data into data blocks, adds Pchit parity bits to the valid data, and then inputs the valid data to the FEC encoding module 102. Then, the FEC encoding module 102 performs FEC encoding on the data input by the check unit processing module 101, to obtain an encoded data block.

Figure 3:
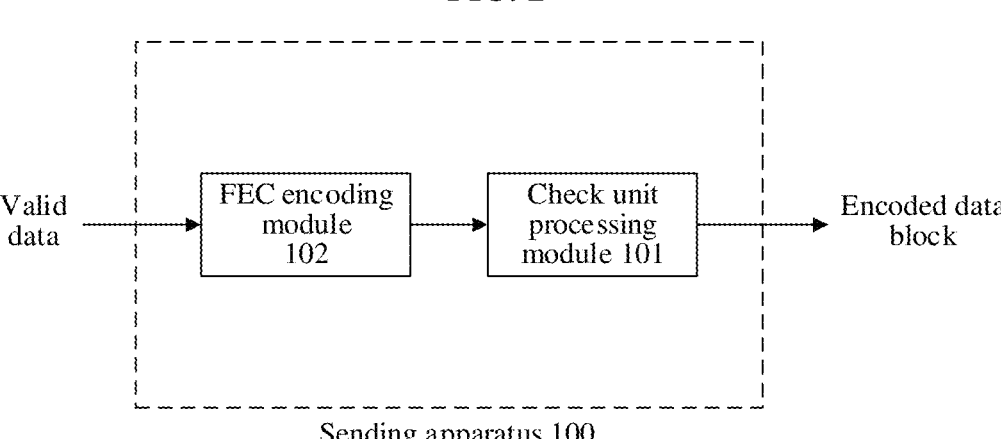
FIG. 3 is a schematic diagram of a structure of another sending apparatus according to an embodiment.

In another possible embodiment, as shown in FIG. 3, a check unit processing module 101 is located after an FEC encoding module 102, in other words, an output of the FEC encoding module 102 is used as an input of the check unit processing module 101. For example, valid data is first input to the FEC encoding module 102. The FEC encoding module 102 performs FEC encoding on the valid data, and then inputs the valid data to the check unit processing module 101. Then, the check unit processing module 101 divides the data input by the FEC encoding module 102 into data blocks and adds Pchit parity bits to the data, to obtain an encoded data block.

Figure 4:
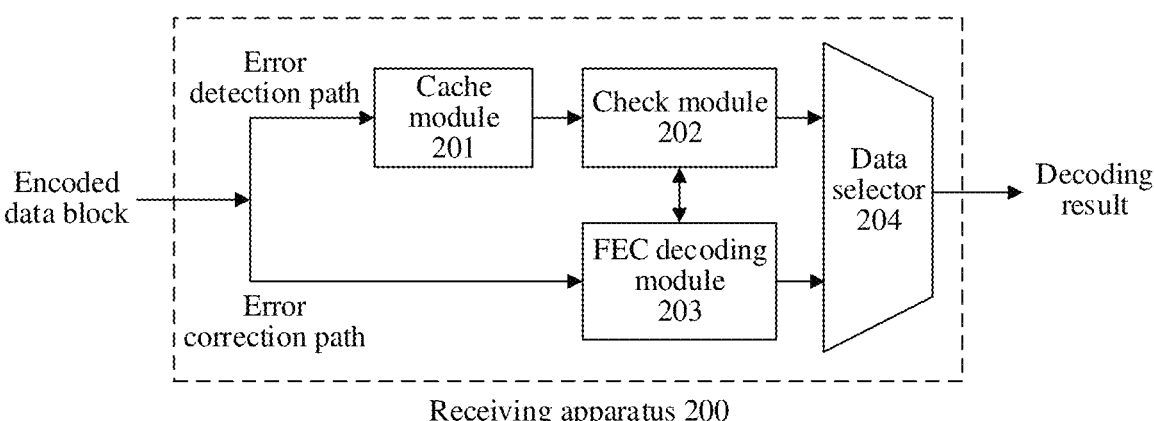
FIG. 4 is a schematic diagram of a structure of a receiving apparatus according to an embodiment.

(2) In a specific embodiment, as shown in FIG. 4, the receiving apparatus 200 includes a cache module 201, a check module 202, an FEC decoding module 203, and a data selector 204.

The cache module 201 is configured to cache data. The check module 202 is configured to check a Pchit, to determine whether an error exists in the Pchit. The FEC decoding module 203 is configured to perform FEC decoding. It should be noted that the cache module 201 and the check module 202 together form an error detection path, and the FEC decoding module 203 forms an error correction path. The data selector 204 is configured to select between output data of the error detection path and output data of the error correction path, and use the selected data as an output of the data selector 204 (such as a decoding result).

In a possible embodiment, as shown in FIG. 4, the cache module 201 is located before the check module 202. In other words, the cache module 201 first caches an encoded data block (or a Pchit), and then the check module 202 checks each Pchit in the encoded data block.

Figure 5:
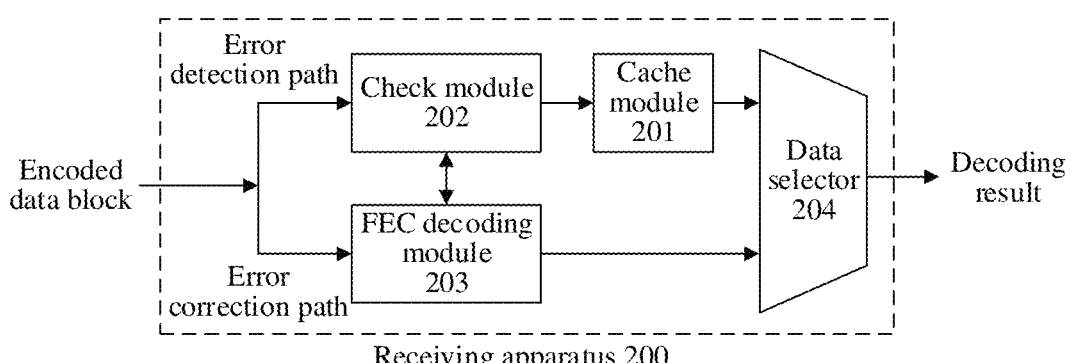
FIG. 5 is a schematic diagram of a structure of another receiving apparatus according to an embodiment.

In another possible embodiment, as shown in FIG. 5, a cache module 201 is located after a check module 202. In other words, the check module 202 first checks each Pchit in an encoded data block, and each time the check module 202 completes the check on one Pchit, the cache module 201 caches the Pchit.

The foregoing two embodiments indicate that the Pchit may be checked after being written into a cache, or may be checked before being written into a cache. Unless otherwise specified, the following uses a solution in which the Pchit is checked after being written into the cache as an example for description.

In some possible embodiments, as shown in FIG. 4, the encoded data block is separately input to the error detection path and the error correction path. Therefore, actions on the error detection path and the error correction path may be performed in parallel.

Figure 6:
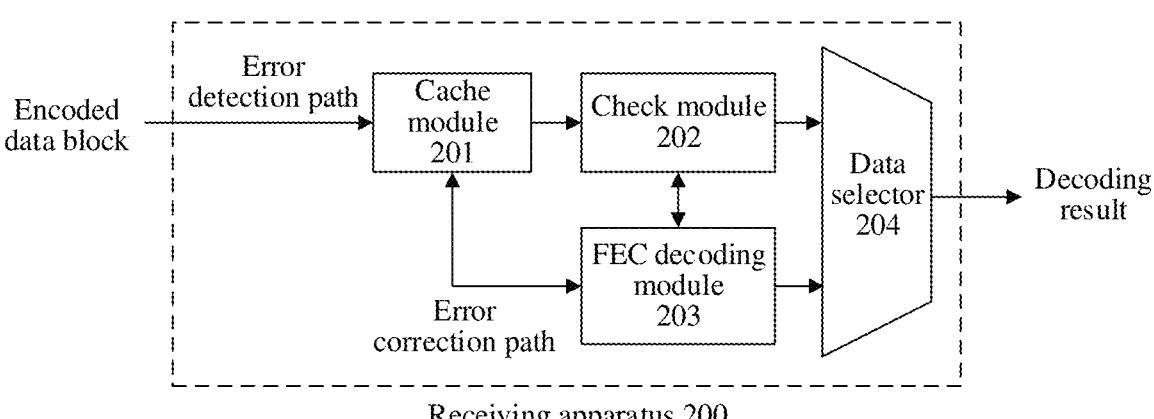
FIG. 6 is a schematic diagram of a structure of another receiving apparatus according to an embodiment.

In some other possible embodiments, as shown in FIG. 6, at the beginning, an encoded data block is input only into an error detection path, but is not input into an error correction path. An FEC decoding module 203 on the error correction path may not work temporarily. Therefore, actions on the error detection path and the error correction path are not performed in parallel. The FEC decoding module 203 starts to work only when receiving an indication of a check module 202, and extracts corresponding data from a cache module 201 to perform FEC decoding. It should be understood that the cache module 201 in FIG. 6 may also be located after the check module 202. Details are not described herein.

It should be noted that division of various functional modules in the sending apparatus 100 and the receiving apparatus 200 is merely an example, and the functional modules may further include more or fewer modules. For example, one functional module may be split into a plurality of modules, a plurality of functional modules may be combined into one module, and there may be another functional module. This is not limited.

Based on the sending apparatus 100 and the receiving apparatus 200, the following separately describes embodiments of a sending method and a receiving method.

FIG. 7 is a first embodiment of a sending method according to an embodiment. The sending method is applied to the foregoing sending apparatus 100, and includes the following steps.

S701: Obtain valid data.

It should be noted that the valid data in this embodiment is to-be-FEC-encoded data, and corresponding FEC encoding needs to be performed on the valid data at a physical layer or at a physical coding sublayer (PCS) of an Ethernet, to enhance a capability of the valid data of resisting channel interference (to enable the valid data to have a error correction capability).

In a possible embodiment, the valid data is data obtained after 64/66 encoding and 264/257 encoding are performed at the Ethernet PCS layer. Therefore, the valid data may be input into the sending apparatus 100 in a unit of 257 bits.

S702: Divide the valid data into data blocks of a specified length, and add a Pchit parity bit to each data block to obtain a corresponding Pchit, where the Pchit parity bit is used to check whether an error exists in the corresponding Pchit.

It should be noted that the "specified length" herein actually specifies a division granularity of a data block or a size of a data block. This is not limited, and may be properly selected based on an actual application scenario.

It should be further noted that, in the previous step S701, the sending apparatus 100 may continuously receive inputs of valid data, but if a data volume of the received valid data does not reach the specified length, the data is not enough to be divided into a data block (or the data is not enough to be processed as one data block). Therefore, the sending apparatus 100 does not perform step S702, but continues receiving an input of valid data. When the data volume of the received valid data reaches the specified length, the sending apparatus 100 may start to perform step S702 to divide the valid data of the specified length into one data block, and add a corresponding Pchit parity bit to the data block.

For example, as shown in FIG. 8, in the sending apparatus 100, a check unit processing module 101 is before an FEC encoding module 102, and the check unit processing module 101 is responsible for receiving an input of valid data.

It should be noted that, dashed lines in a valid data input part in the figure are used to facilitate correspondence with data blocks that are subsequently obtained through division. In this case, the valid data is not divided into the data blocks. It should be further noted that the data block in the figure is represented by a white strip, an FEC parity bit is represented by a strip filled with slashes, and a Pchit parity bit is represented by a gray square. A length relationship between the data block, the FEC parity bit and the Pchit parity bit does not constitute a limitation. One data block and a corresponding Pchit parity bit form one Pchit.

As shown in FIG. 8, the check unit processing module 101 receives the input of the valid data, and then performs an action ①, to divide the valid data into data blocks of a specified length. A transmission sequence between the data blocks in the figure is from right to left. The check unit processing module 101 then performs an action ② to add a corresponding Pchit parity bit to each data block. Each data block and a corresponding Pchit parity bit of the data block together form one Pchit. In other words, each Pchit includes one data block and a corresponding Pchit parity bit of the data block. The Pchit parity bit may be added to the tail of the data block. Then, the check unit processing module 101 inputs Pchits (sequentially) into the FEC encoding module 102.

It should be noted that, for ease of correspondence with an encoded data block obtained after the FEC encoding module

102 performs FEC encoding, a plurality of data blocks and a plurality of Pchits are respectively drawn in the action ① part and the action ② part in the figure. Actually, provided that a data volume of received valid data reaches the specified length, the check unit processing module 101 uses the valid data as one data block (in other words, performs the action ①), adds a corresponding Pchit parity bit to the data block (in other words, performs the action ② to obtain one Pchit, and then sends the Pchit to the FEC encoding module 102. When the data volume of the received valid data reaches the specified length again, the check unit processing module 101 may process the valid data as one data block again, generate one Pchit parity bit for the data block to obtain one Pchit, and then send the Pchit to the FEC encoding module 102.

In a possible embodiment, the Pchit parity bit may be generated by using one encoding manner or a combination of a plurality of encoding manners. The encoding manner may be Bose-Chaudhuri-Hocquenghem (BCH) encoding, extended Bose-Chaudhuri-Hocquenghem, (eBCH) encoding, RS encoding, cyclic redundancy check (CRC) encoding, or the like. This is not limited.

Figures 9, 10:
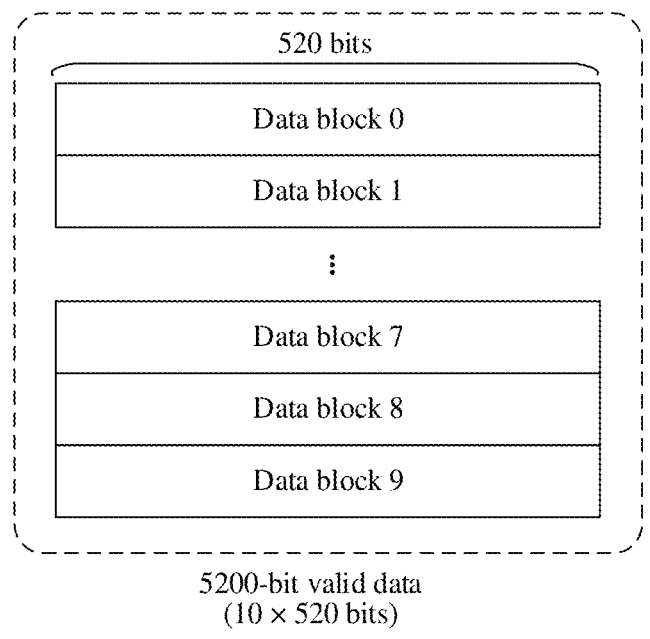
FIG. 9 is a schematic diagram of dividing valid data into data blocks of a specified length according to an embodiment.
FIG. 10 is a schematic diagram of a physical check unit according to an embodiment.

The BCH encoding manner is used as an example. As shown in FIG. 9, it is assumed that a division granularity of a data block is 520 bits. Therefore, the sending apparatus 100 divides 5200-bit valid data in the figure into 10 data blocks, where the 10 data blocks are sequentially represented by a data block 0 to a data block 9, and each data block is 520-bit. It should be noted that a transmission sequence between the data blocks in the figure is from top to bottom, in other words, from the data block 0 to the data block 9.

Then, as shown in FIG. 10, the sending apparatus 100 separately adds corresponding Pchit parity bits to the foregoing 10 520-bit data blocks in a BCH encoding manner. In this case, the Pchit parity bits are BCH parity bits. A data block 1 is used as an example. Data of the data block 1 is encoded by using BCH (544, 520), and a 24-bit BCH parity bit 1 may be generated. Then, the BCH parity bit 1 is added to the tail of the data block 1 to obtain a 544-bit Pchit 1, where the Pchit 1 includes both the 520-bit data block 1 and the 24-bit BCH parity bit 1.

Figures 11, 12:
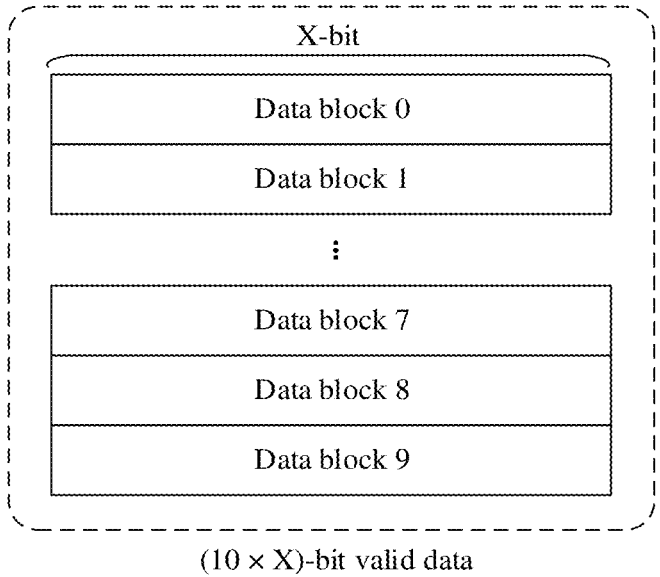
FIG. 11 is another schematic diagram of dividing valid data into data blocks of a specified length according to an embodiment.
FIG. 12 is a schematic diagram of a combination of BCH encoding and CRC encoding according to an embodiment.

A manner of combining the BCH encoding and CRC encoding is further used as an example. As shown in FIG. 11, it is assumed that a division granularity of a data block is X-bit, where X is a positive integer. Therefore, the sending apparatus 100 divides (10×X)-bit valid data in the figure into 10 data blocks, where the 10 data blocks are sequentially represented by a data block 0 to a data block 9, and each data block is X-bit.

Then, as shown in FIG. 12, the sending apparatus 100 separately adds corresponding Pchit parity bits to 10 X-bit data blocks in a manner of combining BCH encoding and CRC encoding. In this case, the Pchit parity bits include two parts: BCH parity bits and CRC parity bits. A data block 0 is used as an example. The BCH encoding and the CRC encoding are separately performed on data of the data block 0, and a Y-bit BCH parity bit 0 and a Z-bit CRC parity bit 0 are generated. Then, the BCH parity bit 0 and the CRC parity bit 0 are added to the tail of the data block 0 to obtain an (X+Y+Z)-bit Pchit 0, where a sequence of adding the BCH parity bit and the CRC parity bit is not limited, and X, Y, and Z are positive integers. In other words, the Pchit 0 includes the X-bit data block 0 and a (Y+Z)-bit Pchit parity bit, and the Y-bit BCH parity bit 0 and the Z-bit CRC parity bit 0 jointly form the Pchit parity bit.

It may be understood that, in comparison with a case in which only one encoding manner is used to generate the Pchit parity bit, if a combination of a plurality of encoding manners is used to generate the Pchit parity bit, adjustment of a length of the Pchit parity bit is more flexible. Therefore, selection of the division granularity of the data block becomes more flexible. For example, when the length of the Pchit parity bit is limited, if the Pchit parity bit is generated by using the combination of a plurality of encoding manners, properly designing lengths of parity bits obtained by each encoding manner can meet a length requirement on the Pchit parity bit, reduce bandwidth usage of the Pchit parity bit, improve reliability of the Pchit parity bit, and reduce a probability of missed error detection.

In a possible embodiment, the division granularity of the data block may be matched with the FEC encoding manner used in the sending apparatus 100, to enable a length of a payload required by the FEC encoding manner to be an integer multiple of the division granularity of the data block. For example, two types of high-gain FEC codewords are defined in the Ethernet standard: RS (544, 514, 15, 10) and RS (528, 514, 7, 10). The two FEC codes can be directly reused, provided that the division granularity of the data block is matched with a length of a payload required by the two codewords.

For example, it is assumed that the FEC encoding manner used by the sending apparatus 100 is RS (544, 514, 10), a length of a payload required by the RS code is 514 symbols, and each symbol includes 10 bits. Therefore, the payload required by the RS code is 514×10 bits=5140 bits. The division granularity of the data block may be designed as X-bit, to enable 5140-bit to be an integer multiple of X-bit, so that the matching between the division granularity of the data block and the FEC encoding manner is implemented. Therefore, an integer quantity of data blocks may be used as the payload of the RS code to perform FEC encoding. In addition, a Pchit parity bit corresponding to each data block is not used as an FEC payload and does not participate in the FEC encoding. In this way, the length of the Pchit parity bit does not affect the FEC encoding, and selection of the length of the Pchit parity bit is flexible.

In another possible embodiment, the division granularity of the data block may be matched with a 64/66 encoding manner and a 264/257 encoding manner used at the Ethernet PCS layer, to enable a division granularity of the Pchit to be an integer multiple of 257 bits, so that the division granularity of the data block can be compatible with a processing granularity at the Ethernet standard PCS layer. For example, before the FEC encoding is performed at the Ethernet PCS layer, the 264/257 encoding is used to compress a 264-bit data unit into a 257-bit data unit. Therefore, the to-be-FEC-encoded data (such as the valid data in this embodiment) is in a unit of 257 bits. To be compatible with the Ethernet standard, the division granularity of the data block may be designed as an integer multiple of 257 bits. Therefore, each data block includes an integer quantity of 257-bit data units, so that the processing granularity of the Ethernet PCS layer is compatible.

Figures 13, 14:
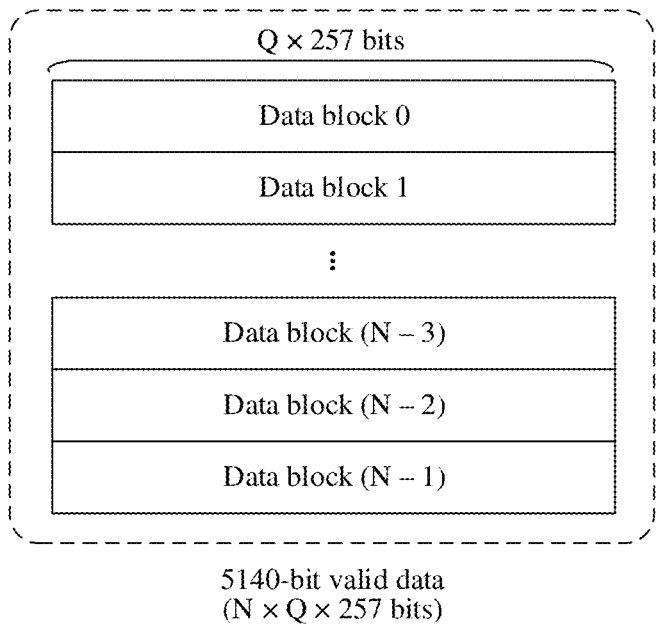
FIG. 13 is a schematic diagram of dividing valid data into data blocks of a specified length according to an embodiment.
FIG. 14 is a schematic diagram of using a data block in a physical check unit as an FEC payload according to an embodiment.

For example, as shown in FIG. 13, it is assumed that the division granularity of the data block is (Q×257) bits, where Q is a positive integer. In this way, the processing granularity at the Ethernet standard PCS layer can be compatible, and each data block includes Q 257-bit data units. Based on the division granularity, the sending apparatus 100 divides 5140-bit valid data in the figure into N data blocks, and the N data blocks are respectively represented by a data block 0 to a data block (N−1), where N is a positive integer. Then, as shown in FIG. 14, an M-bit Pchit parity bit is separately added to each data block to obtain N Pchits, where M is a positive integer, the N Pchits are respectively represented by a Pchit 0 to a Pchit (N−1), and each Pchit includes one (Q×257)-bit data block and one M-bit Pchit parity bit.

It is assumed that the FEC encoding manner used by the sending apparatus 100 is RS (544, 514, 10), and N×Q× 257=5140. Therefore, only the data block (such as a part boxed by a dashed line in the figure) in the N Pchits needs to be used as the FEC payload to perform FEC encoding, and the Pchit parity bit is not used as the FEC payload and does not participate in the FEC encoding. In this way, a length of the Pchit parity bit does not affect the FEC encoding, so that selection of the length of the Pchit parity bit is flexible.

In another possible embodiment, the division granularity of the data block may be an integer multiple of a symbol granularity in the FEC encoding manner.

For example, it is assumed that the used FEC encoding manner is RS (544, 514, 10), and the symbol granularity in the FEC encoding manner is 10 bits. The division granularity of the data block is enabled to be an integer multiple of 10 bits, so that gearbox logic between a data block and an FEC symbol can be removed or simplified.

S703: Perform FEC encoding on the plurality of Pchits based on the used FEC encoding manner, to obtain an encoded data block.

In a possible embodiment, according to the used FEC encoding manner, the FEC encoding is performed by using both the data blocks and the Pchit parity bits in the plurality of Pchits as the FEC payload, to obtain the encoded data block.

For example, refer to FIG. 10. It is assumed that all the Pchits obtained in the previous step S702 are 544 bits, and each Pchit includes one 520-bit data block and one 24-bit BCH parity bit (such as the Pchit parity bit).

Figures 15, 16:
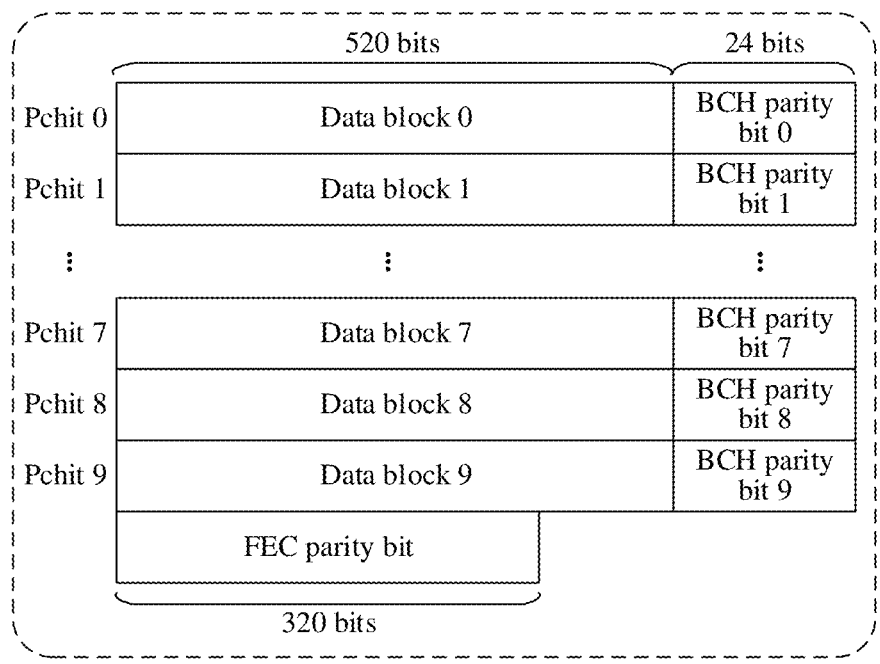
FIG. 15 is a schematic diagram of using both valid data and a BCH parity bit in a physical check unit as an FEC payload according to an embodiment.
FIG. 16 is a schematic diagram of a physical check unit according to an embodiment.

Refer to FIG. 15 then. It is assumed that the used FEC encoding manner is RS (576, 544, 10), and a payload required by an RS codeword is 544×10 bits=5440 bits. Therefore, 10 544-bit Pchits need to be used as the FEC payload to perform FEC encoding. In other words, the BCH parity bit in each Pchit is also used as a part of the FEC payload and participates in the FEC encoding. After the FEC encoding is completed, one 320-bit FEC parity bit is generated. Then, the FEC parity bit is added to the end of a Pchit 9, to obtain an RS codeword, such as a part boxed by a dashed line in FIG. 15, where the RS codeword is the encoded data block, and the FEC parity bit is used to correct an error existing in the encoded data block.

For another example, refer to FIG. 16. It is assumed that all the Pchits obtained in the previous step S702 are 1320 bits, and each Pchit includes one 1285-bit data block and one 35-bit eBCH parity bit. It should be noted that the eBCH parity bit herein, such as a Pchit parity bit, is generated by using an eBCH (1320, 1285) encoding manner. For example, a 35-bit eBCH parity bit 0 may be generated by performing eBCH (1320, 1285) encoding on a 1285-bit data block 0.

Figure 17:
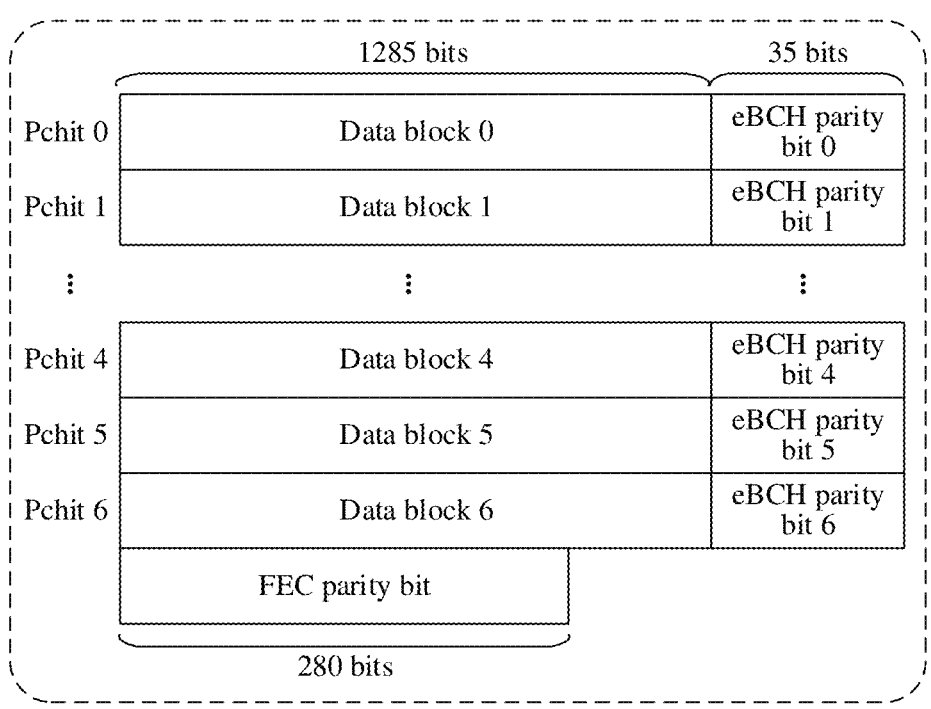
FIG. 17 is a schematic diagram of using both a data block and an eBCH parity bit in a physical check unit as an FEC payload according to an embodiment.

Refer now to FIG. 17. It is assumed that the used FEC encoding manner is RS (952, 924, 10), and a payload required by an RS codeword is 924×10 bits=9240 bits. Therefore, 7 1320-bit Pchits need to be used as the FEC payload to perform FEC encoding, in other words, 7 Pchits from a Pchit 0 to a Pchit 6 in FIG. 16 need to be used as the FEC payload. An eBCH parity bit in each Pchit is also used as a part of the FEC payload and participates in the FEC encoding. After the FEC encoding is completed, one 280-bit FEC parity bit is generated. The FEC parity bit is added to the end of the Pchit 6, to obtain an RS codeword, such as a part boxed by a dashed line in FIG. 17, where the RS codeword is the encoded data block, and the FEC parity bit is used to correct an error existing in the encoded data block.

In another possible embodiment, an FEC encoding module 102 performs, based on the used FEC encoding manner, FEC encoding by using only the data blocks in the plurality of Pchits as the FEC payload, to obtain the encoded data block.

For example, it is assumed that each Pchit obtained in the previous step S702 is 538 bits, and each Pchit includes one 514-bit data block and one 24-bit Pchit parity bit.

Figure 18:
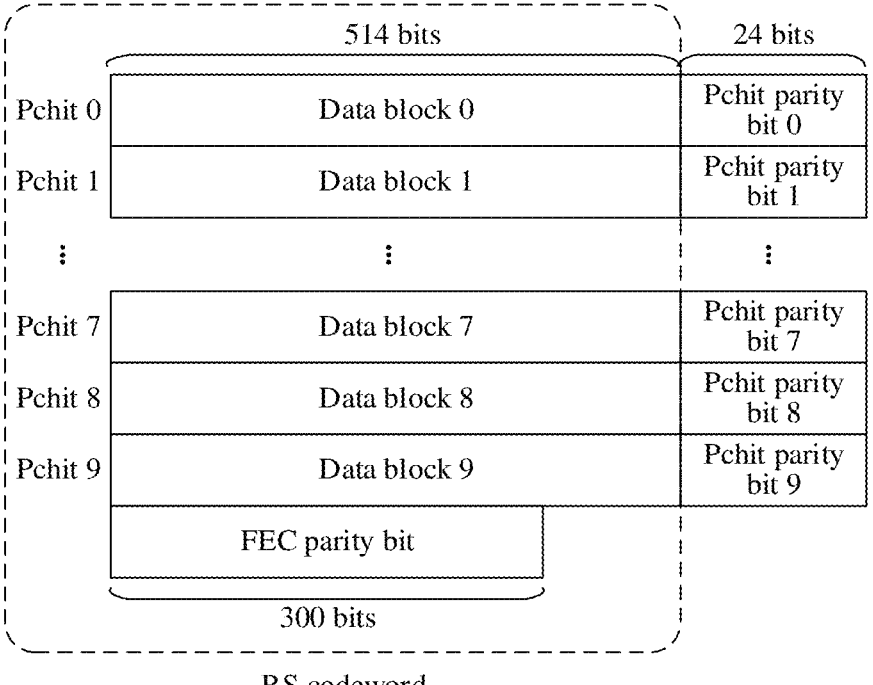
FIG. 18 is a schematic diagram of using only a data block in a physical check unit as an FEC payload according to an embodiment.

As shown in FIG. 18, it is assumed that the used FEC encoding manner is RS (544, 514, 10), and a payload required by an RS codeword is 514×10 bits=5140 bits. Therefore, data blocks in 10 Pchits need to be used as the FEC payload to perform FEC encoding. In other words, a Pchit parity bit in each Pchit is not used as a part of the FEC payload and does not participate in the FEC encoding. After the FEC encoding is completed, one 300-bit FEC parity bit is generated. The FEC parity bit is inserted to the end of a Pchit 9, to obtain an RS codeword, where the RS codeword is a part boxed by a dashed line in FIG. 18.

It can be understood that the RS codeword includes only a data block part in each Pchit, and does not include a Pchit parity bit part. FIG. 18 is used as a whole as one encoded data block (including the RS codeword and the Pchit parity bits in the 10 Pchits).

The foregoing two embodiments show that the Pchit parity bit may be used as a part of the FEC payload to participate in the FEC encoding to obtain the FEC parity bit, or may not be used as the FEC payload and not participate in the FEC encoding.

Therefore, in this embodiment, on a sending apparatus 100 side, valid data is divided into data blocks of a specified length, and a corresponding Pchit parity bit is added to each data block to obtain a Pchit. The Pchit parity bit is used to check whether an error exists in the corresponding Pchit, to enable the Pchit to have a error detection capability. For example, a proper data block division granularity may be selected based on factors such as a used FEC encoding manner and an application scenario. Therefore, the data block division granularity can match various interconnection standards and may be used for interconnection interfaces such as an Ethernet interface and a PCIe interface. Alternatively, a Pchit parity bit may be generated by using one encoding manner or a combination of a plurality of encoding manners, to enable adjustment of a length of the Pchit parity bit to be flexible. Then, FEC encoding is performed on a plurality of Pchits based on the used FEC encoding manner to obtain an encoded data block, to enable the encoded data block to have a error correction capability, and then the encoded data block is sent to the receiving apparatus 200.

Therefore, the receiving apparatus 200 can not only perform independent check on each Pchit in the received encoded data block, to separately determine whether an error exists in each Pchit and predict an error in the encoded data block, but also perform FEC decoding on the encoded data block, to correct the error existing in the encoded data block. In other words, the error detection and the error correction use two different granularities. The error detection uses a Pchit (or a data block in the Pchit) as a granularity, and the error correction uses the entire encoded data block (or the plurality of data blocks) as a granularity. In addition, there is an inclusion relationship between the two granularities (where the encoded data block may include a plurality of Pchits). Therefore, a decoding manner on a receiving apparatus 200 side becomes very flexible. This helps reduce impact of the FEC decoding on a latency and power consumption, and helps meet requirements for a low latency and a high gain.

Figure 19:
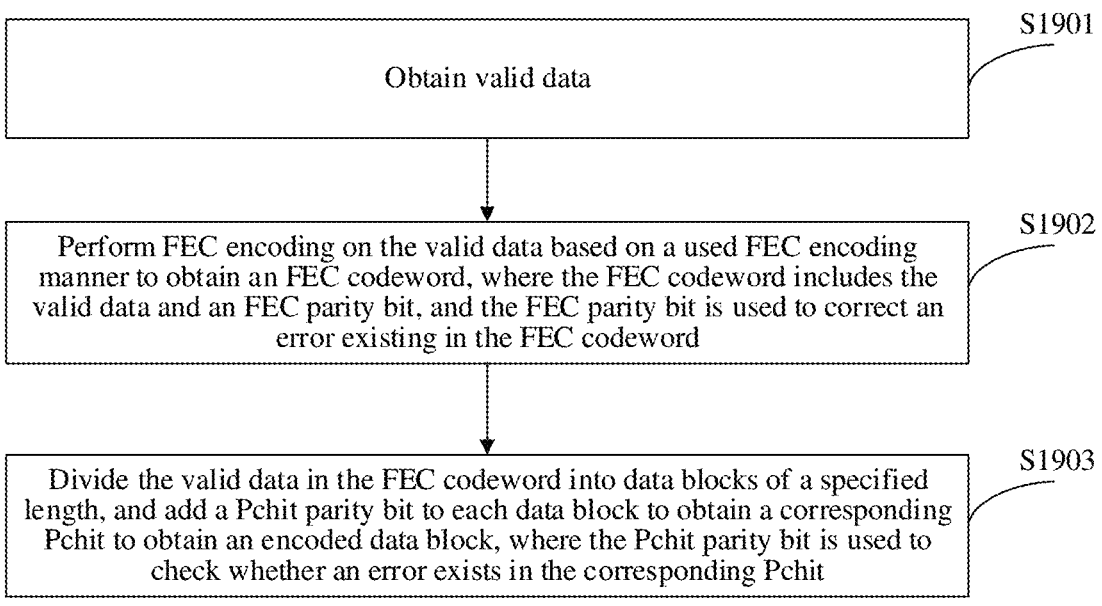
FIG. 19 is a schematic flowchart of another sending method according to an embodiment.

FIG. 19 is a second embodiment of a sending method. The sending method is applied to the sending apparatus 100, and includes the following steps.

S1901: Obtain valid data.

For specific content of step S1901, refer to the foregoing step S701. Details are not repeated herein.

S1902: Perform FEC encoding on the valid data based on a used FEC encoding manner to obtain an FEC codeword, where the FEC codeword includes the valid data and an FEC parity bit, and the FEC parity bit is used to correct an error existing in the FEC codeword.

Figure 20:
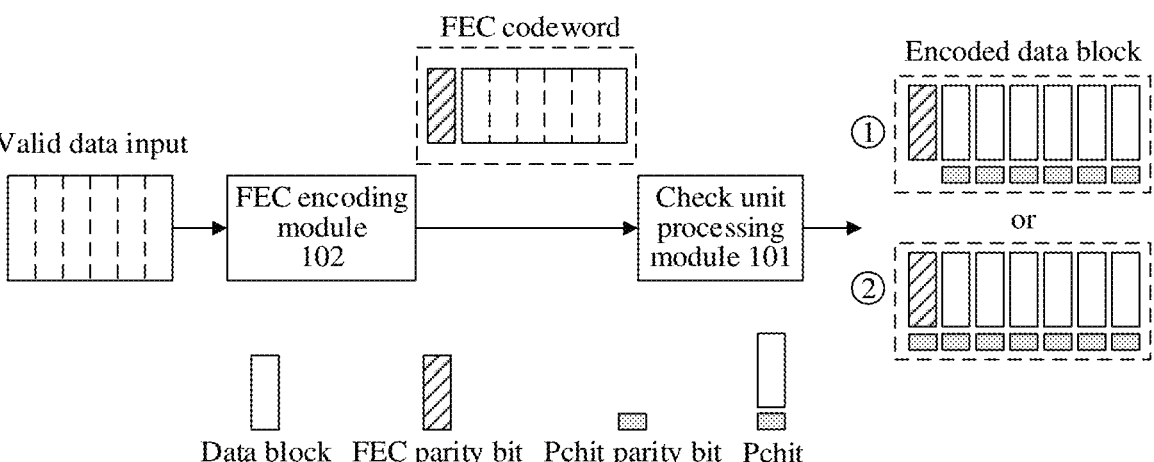
FIG. 20 is a schematic diagram of a processing procedure of a sending apparatus according to an embodiment.

For example, as shown in FIG. 20, an FEC encoding module 102 in the sending apparatus 100 is before a check unit processing module 101, and the FEC encoding module 102 is responsible for receiving an input of the valid data. It should be noted herein that, dashed lines in a valid data input part in the figure are used to facilitate correspondence with data blocks that are subsequently obtained through division. In this case, the valid data is not actually divided into the data blocks.

It is assumed that the FEC encoding manner used in the FEC encoding module 102 is RS (544, 514, 10), and a length of an FEC payload required by the encoding manner is 5140 bits. Therefore, the FEC encoding module 102 performs FEC encoding on the 5140-bit valid data to generate the FEC parity bit, and inserts the FEC parity bit into the tail of the 5140-bit valid data, to obtain the FEC codeword.

It should be noted that dashed lines in the valid data part in the FEC codeword in the figure are also used to facilitate correspondence with data blocks that are subsequently obtained through division. In this case, the valid data in the FEC codeword is not divided into the data blocks.

In a possible embodiment, before the FEC encoding is performed, the valid data may be divided into a plurality of data blocks of a specified length. Then, the FEC encoding is performed on the plurality of data blocks based on the used FEC encoding manner, to obtain the FEC codeword, where the FEC codeword includes the plurality of data blocks and the FEC parity bit, and the FEC parity bit is used to correct the error existing in the FEC codeword.

S1903: Divide the valid data in the FEC codeword into the data blocks of the specified length, and separately add a Pchit parity bit to each data block to obtain a corresponding Pchit, to obtain an encoded data block, where the Pchit parity bit is used to check whether an error exists in the corresponding Pchit.

For example, as shown in FIG. 20, after the FEC encoding module 102 inputs the obtained FEC codeword to the check unit processing module 101, the check unit processing module 101 divides the valid data in the FEC codeword, to obtain a plurality of data blocks of a specified length, and adds a corresponding Pchit parity bit to each data block to obtain one Pchit, where the Pchit parity bit is added to the tail of the data block in each Pchit.

A finally obtained encoded data block is shown in ① in the figure. It can be understood that the FEC parity bit is not processed as one Pchit, and no Pchit parity bit is added to the FEC parity bit.

In a possible embodiment, the valid data in the FEC codeword is divided into a plurality of data blocks of a specified length, a corresponding Pchit parity bit is added to each data block, and the corresponding Pchit parity bit is also added to the FEC parity bit, to obtain an encoded data block.

For example, as shown in FIG. 20, after the FEC encoding module 102 inputs the obtained FEC codeword to the check unit processing module 101, the check unit processing module 101 divides the valid data in the FEC codeword to obtain a plurality of data blocks of a specified length, and adds a corresponding Pchit parity bit to each data block to obtain one Pchit, where the Pchit parity bit is added to the tail of each data block. In addition, the FEC parity bit is also considered as one Pchit for processing, and one corresponding Pchit parity bit is added to the FEC parity bit. For ease of description, the Pchit parity bit corresponding to the FEC parity bit may be referred to as a second parity bit. A finally obtained encoded data block is shown in ② in the figure.

The foregoing two embodiments show that the FEC parity bit may be considered as one Pchit, and one corresponding Pchit parity bit is also added to the FEC parity bit, to determine, based on the Pchit parity bit corresponding to the FEC parity bit, whether an error exists in the FEC parity bit. In this way, reliability of the FEC parity bit is improved. The FEC parity bit may not be processed as a Pchit, and the corresponding Pchit parity bit may not be added to the FEC parity bit.

It should be noted that, for a method for generating the Pchit parity bit in step S1903 and selection of a data block division granularity, refer to related content in step S702. Details are not described herein again.

It may be understood that an essential difference between the sending methods in FIG. 7 and FIG. 19 lies in a sequence of the FEC encoding and adding the Pchit parity bit. The Pchit parity bit may be added before the FEC encoding is performed, or may be added after the FEC encoding is performed. Further, the two actions may alternatively be performed simultaneously.

Thus, in this embodiment, on the sending apparatus 100 side, FEC encoding is performed on valid data based on a used FEC encoding manner to generate an FEC parity bit, and then the FEC parity bit is added to the tail of the valid data to obtain an FEC codeword, so that the FEC codeword has a error correction capability, and an error existing in the FEC codeword may be corrected based on the FEC parity bit. Then, the sending apparatus 100 divides the valid data in the FEC codeword into data blocks of a specified length, and adds a corresponding Pchit parity bit to each data block to obtain one Pchit, to obtain an encoded data block, where the Pchit parity bit is used to check whether an error exists in the corresponding Pchit. For example, a proper data block division granularity may be selected based on factors such as the used FEC encoding manner and an actual application scenario, and the Pchit parity bit may alternatively be generated by using one encoding manner or a combination of a plurality of encoding manners.

The sending apparatus 100 sends the encoded data block to the receiving apparatus 200 through a corresponding communication link. Due to impact of link noise, an error may exist in the encoded data block obtained by the receiving apparatus 200. Therefore, the receiving apparatus 200 can not only perform independent check on each Pchit in the encoded data block, to determine whether an error exists in each Pchit and predict the error in the encoded data block, but also perform FEC decoding on the received encoded data block, to correct the error existing in the encoded data block. Therefore, a decoding manner of the encoded data block on the receiving apparatus 200 side may be very flexible. This helps reduce impact of the FEC decoding on a latency and power consumption.

Figure 21:
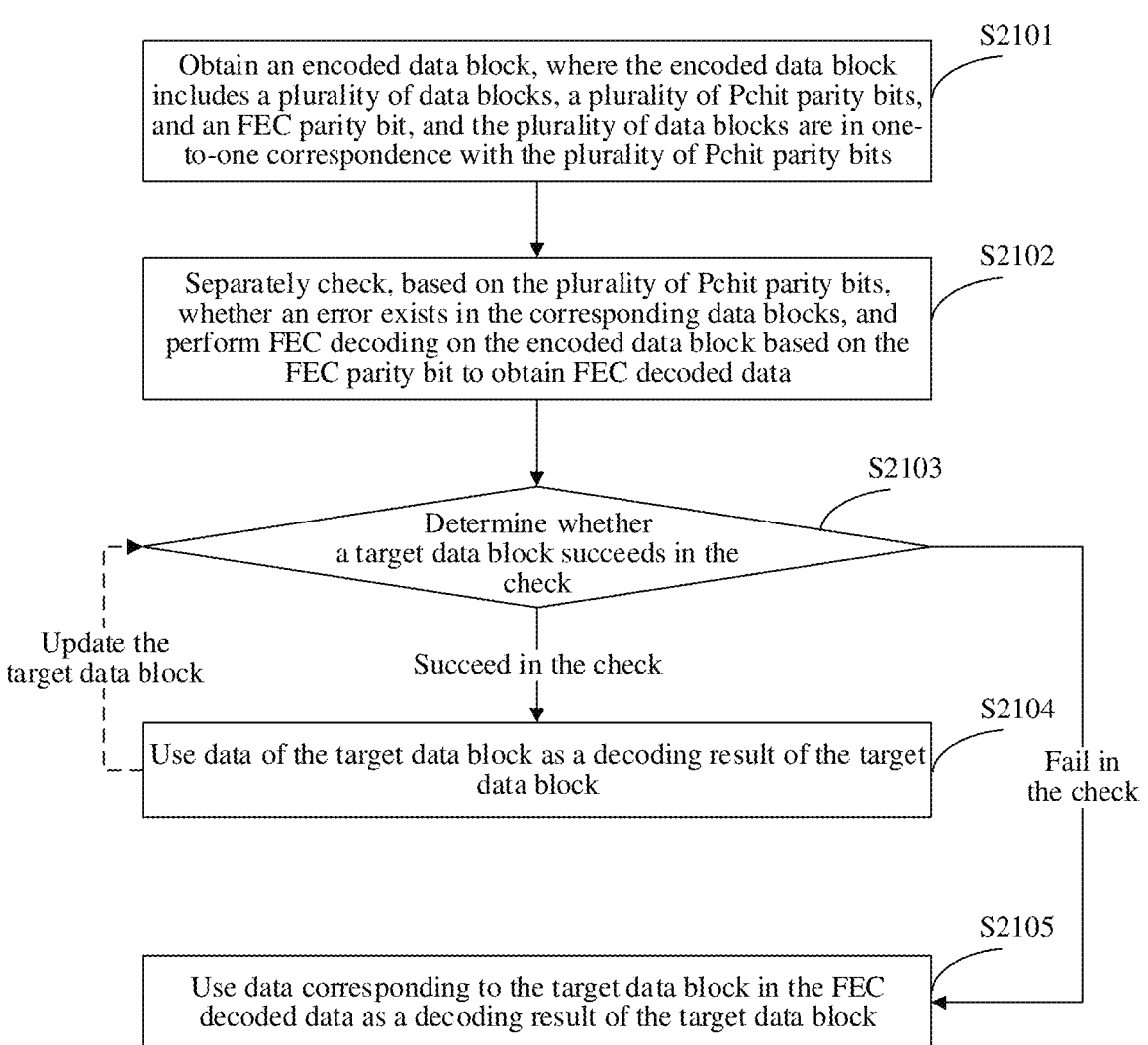
FIG. 21 is a schematic flowchart of a receiving method according to an embodiment.

FIG. 21 is a first embodiment of a receiving method according to an embodiment. The method is applied to the receiving apparatus 200 and includes the following steps.

S2101: Obtain an encoded data block, where the encoded data block includes a plurality of data blocks, a plurality of Pchit parity bits, and an FEC parity bit, and the plurality of data blocks are in one-to-one correspondence with the plurality of Pchit parity bits.

Each data block and a corresponding Pchit parity bit of the data block form one Pchit, and the Pchit parity bit is used to check whether an error exists in the corresponding Pchit. The FEC parity bit is used to find and correct an error in the encoded data block (or the plurality of data blocks).

It can be understood from the foregoing descriptions that the encoded data block is from the sending apparatus 100, and the encoded data block of the sending apparatus 100 is sent to the receiving apparatus 200 through a communication link. Due to impact of factors such as link noise, an error may exist in the encoded data block obtained by the receiving apparatus 200. Therefore, the receiving apparatus 200 needs to perform error detection and/or error correction on the encoded data block, to obtain correct data, in other words, restore original valid data.

For a specific form of the encoded data block, a method for generating the Pchit parity bit, and the like, refer to related descriptions in embodiments of FIG. 7 and FIG. 19. Details are not described herein again.

S2102: Separately check, based on the plurality of Pchit parity bits, whether an error exists in the corresponding data blocks, and perform FEC decoding on the encoded data block based on the FEC parity bit, to obtain FEC decoded data.

It should be noted that the FEC decoded data obtained after the FEC decoding is performed on the encoded data block is post-correction data (in other words, the error in the encoded data block has been corrected). The plurality of data blocks in the encoded data block respectively have corresponding data in the FEC decoded data.

It should be further noted that, when obtaining one Pchit in the encoded data block, the receiving apparatus 200 may directly start to check the Pchit, and does not need to wait until a complete encoded data block is received before starting the Pchit check. However, the receiving apparatus 200 can start the FEC decoding only after receiving the entire encoded data block. In this case, the FEC decoding introduces a frame receiving latency.

In a possible embodiment, the two actions of the "separately checking, based on the plurality of Pchit parity bits, whether an error exists in the corresponding data blocks" and the "performing FEC decoding on the encoded data block based on the FEC parity bit, to obtain FEC decoded data" may be performed simultaneously/synchronously/in parallel.

In a possible embodiment, the plurality of data blocks in the encoded data block have a sequence. The separately checking, based on the plurality of Pchit parity bits, whether an error exists in the corresponding data blocks includes: sequentially checking, based on the plurality of Pchit parity bits, whether an error exists in the corresponding data blocks.

Figures 22, 23:
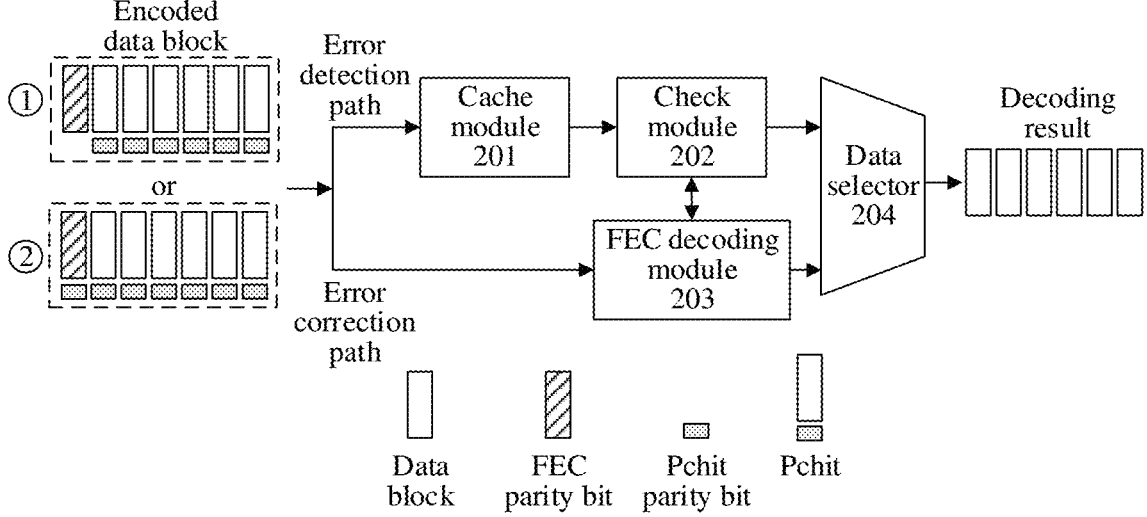
FIG. 22 is a schematic diagram of parallel execution of an error detection path and an error correction path according to an embodiment.
FIG. 23 is a schematic diagram of an encoded data block according to an embodiment.

For example, as shown in FIG. 22, it can be understood from the foregoing descriptions of the actions on the sending apparatus 100 side that the encoded data block obtained by the receiving apparatus 200 may have two different forms: ① and ②. No corresponding Pchit parity bit is added to an FEC parity bit in the ① type. However, a corresponding Pchit parity bit is added to an FEC parity bit in the ② type. For ease of description, the following uses the ① type of encoded data block as an example for description.

As shown in FIG. 22, the encoded data block is separately input to an error detection path and an error correction path, and actions on the error correction path and the error correction path may be performed in parallel. The error detection path is responsible for checking each Pchit in the encoded data block. The error correction path is responsible for performing FEC decoding on the encoded data block to obtain the FEC decoded data.

It can be understood that a check module 202 performs check at a granularity of a Pchit (or a granularity of a data block), and an FEC decoding module 203 performs FEC decoding at a granularity of an encoded data block (or a plurality of data blocks). The Pchit check can be faster than the FEC decoding. In this case, an FEC decoding latency on the error correction path is greater than a Pchit check latency on the error detection path. Therefore, to avoid disorder of output decoding results, a cache module 201 is used in the figure to cache the encoded data block.

S2103: Determine whether a target data block succeeds in the check, and if the target data block succeeds in the check, proceed to step S2104; or if the target data block fails in the check, proceed to step S2105.

The target data block is any one of the plurality of data blocks in the encoded data block.

For example, as shown in FIG. 15, it is assumed that the encoded data block includes 10 544-bit Pchits and a 320-bit FEC parity bit, and each Pchit includes one 520-bit data block and one 24-bit Pchit parity bit (where it is assumed that the Pchit parity bit is a BCH parity bit generated by using a BCH encoding manner). It is assumed that a data block 0 is the target data block, the receiving apparatus 200 starts to check the target data block 0 based on a BCH parity bit 0.

A specific check solution may be as follows: The receiving apparatus 200 performs BCH encoding on the data block 0 based on the BCH encoding manner used in the sending apparatus 100 to generate one BCH parity bit. Then, the BCH parity bit generated by the receiving apparatus 200 is compared with the BCH parity bit 0 in a Pchit 0. If the BCH parity bit and the BCH parity bit 0 are consistent, it indicates that no error exists in the data block 0, and the data block 0 succeeds in the check. If the BCH parity bit and the BCH parity bit 0 are inconsistent, it indicates that an error exists in the data block 0, and the data block 0 fails in the check.

For another example, as shown in FIG. 23, it is assumed that the encoded data block includes 10 (X+Y+Z)-bit Pchits and a 320-bit FEC parity bit, and each Pchit includes one X-bit data block and one (Y+Z)-bit Pchit parity bit. It is assumed herein that a Y-bit BCH parity bit and a Z-bit CRC parity bit jointly form the Pchit parity bit.

It is assumed that a data block 1 is the target data block, the receiving apparatus 200 starts to check the data block 1 based on a Pchit parity bit corresponding to the data block 1. A specific check solution may be as follows: BCH encoding is performed on the data block 1 by using a BCH encoding manner same as that of the sending apparatus 100 to generate a BCH parity bit. The BCH parity bit generated by the receiving apparatus 200 is compared with a BCH parity bit in the Pchit 1. If the two BCH parity bits are inconsistent, it indicates that an error exists in the data block 1, and the data block 1 fails in the check. If the two BCH parity bits are consistent, a CRC encoding manner same as that of the sending apparatus 100 is still used to perform CRC encoding on the data block 1 to generate a CRC parity bit. Then, the CRC parity bit generated by the receiving apparatus 200 is compared with a CRC parity bit in the Pchit 1. If the two CRC parity bits are inconsistent, it indicates that an error exists in the data block 1, and the data block 1 fails in the check. If the two CRC parity bits are consistent, it indicates that no error exists in the data block 1, and the data block 1 succeeds in the check.

It should be noted that in the foregoing example, the BCH check is performed first, and then the CRC check is performed on demand. Actually, the CRC check may alternatively be performed first, and then the BCH check is performed on demand. This is not limited.

It may be understood that a probability of detecting an error is higher when the check is performed by using a combination of a plurality of encoding manners. In a manner such as the manner combining the BCH check and the CRC check, because generator polynomials of the two codes are different, the BCH may fail to detect some errors, in other words, an error detection capability of a single code is limited, but the CRC may detect the errors. The two check manners can be complementary. In this way, reliability of the Pchit parity bit is improved, and a probability of missed error detection is reduced.

S2104: Use data of the target data block as a decoding result of the target data block.

It should be noted that, if the data blocks in the encoded data block are sequentially checked, after the current target data block succeeds in the check and is output as the decoding result of the target data block, a next data block of the target data block may be updated to the target data block and is checked, and step S2103 is performed.

Figure 24:
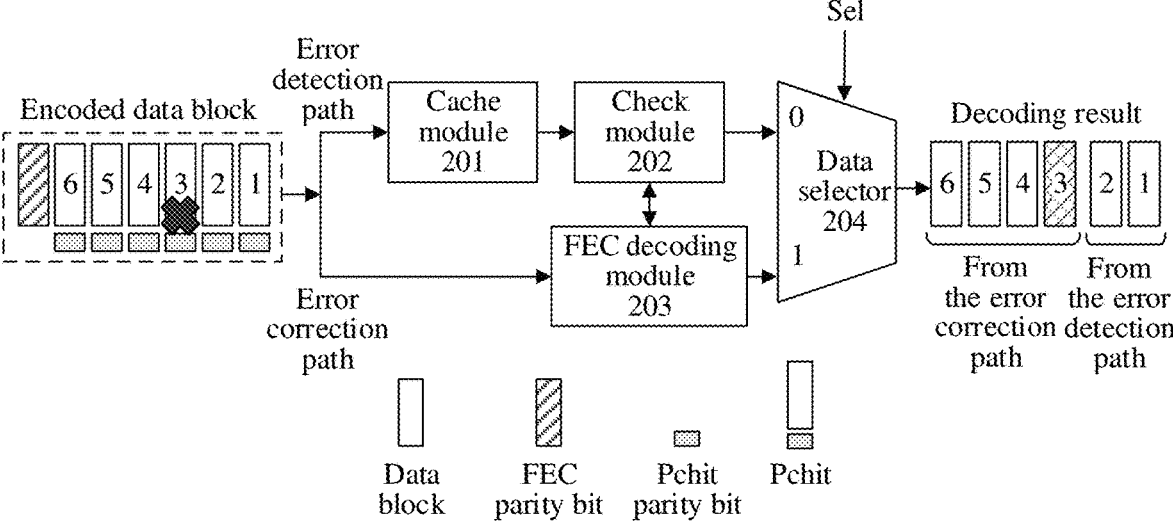
FIG. 24 is a schematic diagram of a processing procedure of another receiving apparatus according to an embodiment.

For example, as shown in FIG. 24, it is assumed that the obtained encoded data block includes 6 Pchits (where each Pchit includes one data block and one Pchit parity bit). For ease of description, data blocks of the Pchits in the figure are respectively marked with sequence numbers 1 to 6, respectively represent a data block 1 to a data block 6, and sequentially correspond to a Pchit 1 to a Pchit 6. It is assumed herein that an error exists in the Pchit 3 in the encoded data block and no error exists in each of the other Pchits.

It can be understood from step S2102 that the encoded data block is separately input to the error detection path and the error correction path in the receiving apparatus 200 for processing. An FEC decoding module 203 on the error correction path performs FEC decoding on the encoded data block at a low speed. However, a check module 202 on the error detection path performs check on the target data block in the encoded data block at a high speed. It is assumed that the current target data block is the data block 1. In this way, the check module 202 first obtains a check result of the data block 1. However, the FEC decoding module 203 is still performing FEC decoding on the encoded data block, and has not obtained the FEC decoded data.

The check result of the data block 1 indicates that no error exists in the data block 1. Therefore, the data block 1 succeeds in the check. Then, the check module 202 outputs data of the data block 1 to a data selector 204, and sets a control signal Sel of the data selector 204 to 0. Therefore, the data selector 204 uses the data of the data block 1 input by the check module 202 as an output of the data selector 204, in other words, outputs a decoding result of the data block 1.

Similarly, the check module 202 continues to check the data block 2 and the data block 2 succeeds in the check. Then, the check module 202 sends the data block 2 to the data selector 204, and sets the Sel to 0. Therefore, the data selector 204 also uses the data block 2 input by the check module 202 as an output of the data selector 204, such as a decoding result of the data block 2.

S2105: Use data corresponding to the target data block in the FEC decoded data as a decoding result of the target data block.

It should be noted that, if an error exists in the target data block, when the FEC decoding is performed on the encoded data block in step S2102, the error of the target data block in the encoded data block is corrected. Therefore, the data corresponding to the target data block in the obtained FEC decoded data is obtained after error correction is performed. If no error exists in the target data block, the data corresponding to the target data block in the FEC decoded data is not corrected.

In a possible embodiment, the plurality of data blocks in the encoded data block do not need to be sequentially checked, and may be checked simultaneously/in parallel. In other words, a sequence of data blocks is not considered during the check. Therefore, after the target data block succeeds in the check, the data corresponding to the target data block in the FEC decoded data may be directly used as the decoding result of the target data block. Then, decoding results of the data blocks may be further adjusted, to enable the decoding results to conform to the sequence of the data blocks.

In a possible embodiment, the plurality of data blocks in the encoded data block have a sequence, and the plurality of data blocks are sequentially checked. The using data corresponding to the target data block in the FEC decoded data as a decoding result of the target data block includes: respectively using the data corresponding to the target data block and data corresponding to another data block following the target data block in the FEC decoded data as the decoding result of the target data block and a decoding result of the another data block following the target data block. In this case, an error detection result of the another data block following the target data block may be ignored, and the error detection and check on the another data block following the target data block may even be directly stopped, to reduce energy consumption.

In the foregoing example, it is assumed that the data blocks in the encoded data block are sequentially checked. Now that the data block 1 and the data block 2 have been checked, the following starts to check the data block 3, in other words, the data block 3 becomes the target data block. A check result indicates that an error exists in the data block 3. In this case, the data block 3 fails in the check. The check module 202 sends indication information to the FEC decoding module 203 to indicate that an error exists in the data block 3, and sets the control signal Sel of the data selector 204 to 1. In this case, the data selector 204 waits for an output of the FEC decoding module 203.

It may be understood that, because a speed of the FEC decoding is slow, the FEC decoding module 203 may not complete the FEC decoding on the encoded data block when receiving the indication information of the check module 202. After completing the FEC decoding, the FEC decoding module 203 may obtain the FEC decoded data, and data corresponding to the data block 3 in the FEC decoded data is data obtained after the error of the data block 3 is corrected.

Based on the indication information, the FEC decoding module 203 inputs data corresponding to the data block 3 to the data block 6 in the FEC decoded data to the data selector 204. Because the control signal Sel of the data selector 204 is now in the "1" state, the data selector 204 uses the data input by the FEC decoding module 203 as an output of the data selector 204, and does not select data of the check module 202. In this case, check results of the data block 4 to the data block 6 after the data block 3 are ignored.

Then, the FEC decoding module 203 may further send an indication to the check module 202, to enable the check module 202 to start to sequentially check data blocks in a next encoded data block.

As shown in FIG. 24, a part of the decoding result that corresponds to the encoded data block and that is output by the data selector 204 is from the error detection path (the data block 1 and the data block 2), and the other part is from the error correction path (the data block 3 to the data block 6, where it should be noted that the data block 3 herein is the data of the data block 3 obtained after the error correction is performed).

Thus, in this embodiment, on the receiving apparatus 200 side, error detection and error correction are performed separately, and may be performed in parallel. The error detection separately performs check on Pchits in an encoded data block at a processing granularity of a Pchit (or a data block). The error correction performs FEC decoding on the encoded data block at a processing granularity of an encoded data block (or a plurality of data blocks).

In this embodiment, a link bit error distribution rule is fully utilized, and an error distribution status in the encoded data block can be quickly learned by performing independent check on each data block in the encoded data block. When no error exists in each Pchit in the encoded data block, decoding results corresponding to the encoded data block all come from the error detection path, and there is no need to wait for FEC decoded data obtained through FEC decoding on the error correction path (equivalent to bypassing an FEC decoding module 203). Therefore, an FEC frame receiving latency and an FEC decoding latency can be omitted, so that an overall latency of interface processing is reduced. This solves a problem that high-gain FEC has a great impact on a latency, and meets a requirement of a low-latency scenario. When an error is detected in a Pchit in the encoded data block, the FEC decoded data obtained from the error correction path needs to be used, and corresponding data in the FEC decoded data is used as the decoding result. This ensures that an output bit error rate is not too high in a high insertion loss link scenario.

It may be understood that, the use of the FEC decoded data and introduction of the FEC decoding latency are needed only when an error exists. Therefore, impact of the FEC frame receiving latency and the FEC decoding latency on an interface latency is reduced, and the fixed FEC decoding latency is changed to a dynamic latency jitter. This eliminates a latency disadvantage of a high-gain FEC code. Generally, a decoding latency of the high-gain FEC code can be higher. However, in this embodiment, an FEC code length (corresponding to the frame receiving latency) and an error correction capability (corresponding to the decoding latency) can be decoupled from a static latency at a physical layer. This expands an application prospect of the high-gain FEC code in a low-latency field, and can meet requirements for both a low latency and a high gain.

Figure 25:
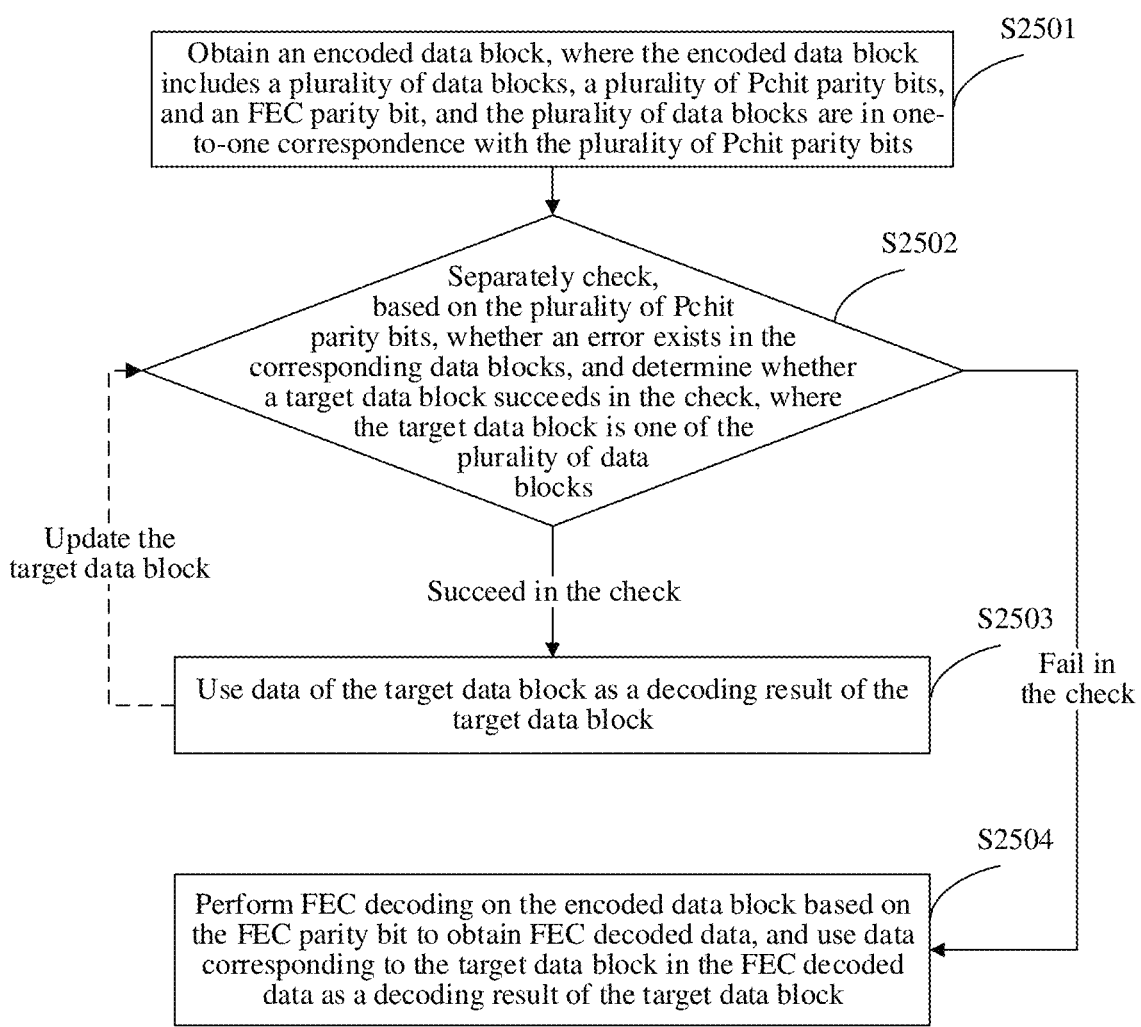
FIG. 25 is a schematic flowchart of another receiving method according to an embodiment.

FIG. 25 is a second embodiment of a receiving method according to an embodiment. The method is applied to the receiving apparatus 200 and includes the following steps.

S2501: Obtain an encoded data block, where the encoded data block includes a plurality of data blocks, a plurality of Pchit parity bits, and an FEC parity bit, and the plurality of data blocks are in one-to-one correspondence with the plurality of Pchit parity bits.

For specific content of step S2501, refer to step S2101. Details are not described herein again.

S2502: Separately check whether an error exists in the corresponding data blocks based on the plurality of Pchit parity bits, and determine whether a target data block succeeds in the check, where the target data block is one of the plurality of data blocks. When the target data block succeeds in the check, step S2503 is performed. When the target data block fails in the check, step S2504 is performed.

It should be noted that the target data block may be any one of a plurality of data blocks in the encoded data block. For a specific check solution of the target data block, refer to related content in step S2103. Details are not repeated herein.

In a possible embodiment, the plurality of data blocks in the encoded data block have a sequence. The separately checking, based on the plurality of Pchit parity bits, whether an error exists in the corresponding data blocks includes: separately and sequentially checking, based on the plurality of Pchit parity bits, whether an error exists in the corresponding data blocks.

S2503: Use data of the target data block as a decoding result of the target data block.

It should be noted that, if the data blocks in the encoded data block are sequentially checked, after the current target data block succeeds in the check and the data of the target data block is output as the corresponding decoding result of the target data block, a next data block of the target data block may be updated to the target data block and is checked, and step S2502 is performed to determine whether the new target data block succeeds in the check.

Figure 26:
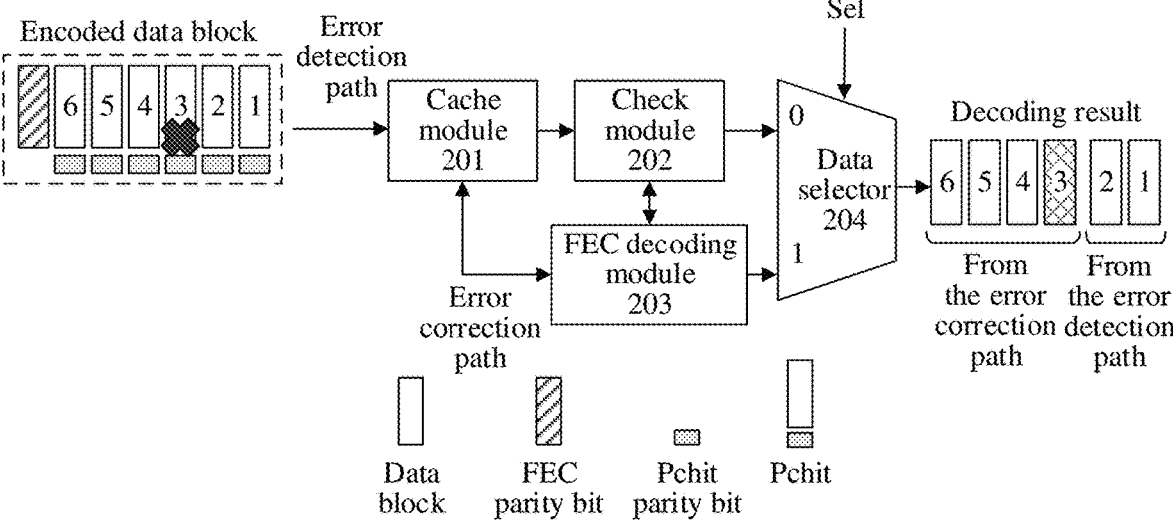
FIG. 26 is a schematic diagram of starting FEC decoding on demand according to an embodiment.

For example, as shown in FIG. 26, it is assumed that the encoded data block includes 6 Pchits (where each Pchit includes two parts of a data block and a Pchit parity bit). For ease of description, data blocks of the Pchits in the figure are respectively marked with sequence numbers 1 to 6, represent a data block 1 to a data block 6, and sequentially correspond to a Pchit 1 to a Pchit 6. It is assumed that an error exists in the Pchit 3 in the encoded data block and no error exists in the other Pchits. As shown in FIG. 26, at the beginning, the encoded data block is input only to an error detection path of the receiving apparatus 200, and is not input to an error correction path. An FEC decoding module 203 on the error correction path does not work temporarily, so that energy consumption can be reduced. In this case, the error detection path and the error correction path do not work in parallel.

On the error detection path, a check module 202 starts to check only after a cache module 201 caches the encoded data block (or only after a Pchit is cached). It is assumed that a data block 1 is the target data block. Because no error exists in a Pchit 1, the data block 1 succeeds in the check. Then, the check module 202 sends data of the data block 1 to a data selector 204, and sets a control signal Sel of the data selector 204 to 0. Therefore, the data selector 204 outputs the data of the data block 1 sent by the check module 202 as a decoding result of the data block 1.

Then, a data block 2 is set as the target data block. Similarly, the check module 202 checks a Pchit 2 and the Pchit 2 succeeds in the check. The check module 202 inputs data of the data block 2 to the data selector 204, and sets the Sel to 0. Then, the data selector 204 outputs the data of the data block 2 input by the check module 202 as the decoding result of the data block 2.

S2504: Perform FEC decoding on the encoded data block based on the FEC parity bit, to obtain FEC decoded data, and use data corresponding to the target data block in the FEC decoded data as a decoding result of the target data block.

In other words, check failure information of the target data block is used as a trigger signal of the FEC decoding module 203, and then the FEC decoding starts to be performed.

In a possible embodiment, the plurality of data blocks in the encoded data block have a sequence, and the plurality of data blocks are sequentially checked. The performing FEC decoding on the encoded data block based on the FEC parity bit, to obtain FEC decoded data, and using data corresponding to the target data block in the FEC decoded data as a decoding result of the target data block includes: performing FEC decoding on the encoded data block based on the FEC parity bit, to obtain the FEC decoded data, and respectively using the data corresponding to the target data block and data corresponding to another data block following the target data block in the FEC decoded data as the decoding result of the target data block and a decoding result of the another data block following the target data block. In this case, an error detection result of the another data block following the target data block may be ignored (in other words, the check on a subsequent data block can still be continued, but an output of the data selector 204 is not affected), and the error detection and check on the another data block following the target data block may even be directly stopped.

In the foregoing example, as shown in FIG. 26, after the data block 1 and the data block 2 are sequentially checked, the data block 3 becomes the target data block, and the check module 202 starts to check the data block 3. Due to an error existing in the Pchit 3, the data block 3 fails in the check. Then, the check module 202 sends indication information to the FEC decoding module 203, to indicate that an error exists in the Pchit 3, and indicate the FEC decoding module 203 to perform FEC decoding on the encoded data block in which the Pchit 3 is located. The check module 202 further sets a control signal Sel of the data selector 204 to 1. Therefore, the data selector 204 no longer selects data of the error detection path, error detection results of the data block 4 to the data block 6 are ignored, and the output of the data selector 204 is not affected.

After receiving the indication information of the check module 202, the FEC decoding module 203 starts to work, and obtains, from the cache module 201, the encoded data block in which the Pchit 3 is located (or an FEC codeword in which the Pchit 3 is located) to perform FEC decoding to obtain the FEC decoded data. Then, the FEC decoding module 203 sends, based on the indication information, data corresponding to the data block 3 and data corresponding to another data block following the data block 3 in the FEC decoded data to the data selector 204. Because the Sel signal is now in the "1" state, the data selector 204 outputs the data input by the FEC decoding module 203 as a decoding result. Then, the FEC decoding module 203 may further send indication information to the check module 202, to enable the check module 202 to start to sequentially check Pchits in a next encoded data block. The FEC decoding module 203 may stop working again, to reduce energy consumption.

As shown in FIG. 26, a part of the decoding result that corresponds to the encoded data block and that is output by the data selector 204 is from the error detection part (the data block 1 and the data block 2), and the other part is from the error correction path (the data block 3 to the data block 6, where it should be noted that the data block 3 herein is a result obtained after the data in the data block 3 is corrected, and is not the data block 3 in which an error exists). It may be understood that, if no error exists in an encoded data block, the FEC decoding module 203 is not started, and all decoding results of the encoded data block that are output by the data selector 204 are from the error detection path.

Thus, in this embodiment, on the receiving apparatus 200 side, independent check is performed on each data block in an encoded data block, so that an error in the encoded data block can be predicted. When a target data block succeeds in the check, data of the target data block is output as a decoding result of the target data block. An FEC decoding function on an error correction path is started only when the target data block fails in the check. The FEC decoding is performed on the encoded data block in which the target data block is located to obtain FEC decoded data, and corresponding data in the FEC decoded data is used as a decoding result.

It can be understood that the receiving apparatus 200 uses an encoded data block as an error correction granularity, and uses a relatively small Pchit (or a data block) as an error detection granularity. In this embodiment, a link bit error distribution rule is fully utilized, and an error distribution status in an encoded data block can be quickly learned by independently checking each data block in the encoded data block. When no error exists in each data block in the encoded data block, the FEC decoding does not need to be started, and there is no need to wait for the FEC decoded data. The decoding results corresponding to the encoded data block all come from the error detection path. Therefore, an FEC frame receiving latency and an FEC decoding latency are omitted. In this way, an overall latency of interface processing is reduced, a problem that high-gain FEC has a great impact on a latency is resolved, a requirement of a low-latency scenario can be met, and power consumption of the FEC decoding can be further reduced. FEC decoding is started only when an error is detected in a data block in the encoded data block, to implement an error correction function and ensure an output bit error rate in a high insertion loss link scenario.

The FEC decoding function needs to be started only when an error exists. Therefore, impact of the FEC frame receiving latency and the FEC decoding latency on an interface latency is reduced, the fixed FEC decoding latency is changed to a dynamic latency jitter, and the latency is increased only when an error exists. This eliminates a latency disadvantage of a high-gain FEC code. In addition, the power consumption of the FEC decoding does not exist when no error exists, so that the impact of the FEC decoding on the power consumption can be reduced.

It should be noted that this embodiment is applicable to all interconnection interfaces that need to introduce an FEC function to improve link quality, for example, an Ethernet interface, a PCIe interface, or a small computer system interface (SCSI), and may be widely used in interconnection scenarios such as a processor, an accelerator, a memory, an I/O device, a network switching device, and a computing device.

Figure 27:
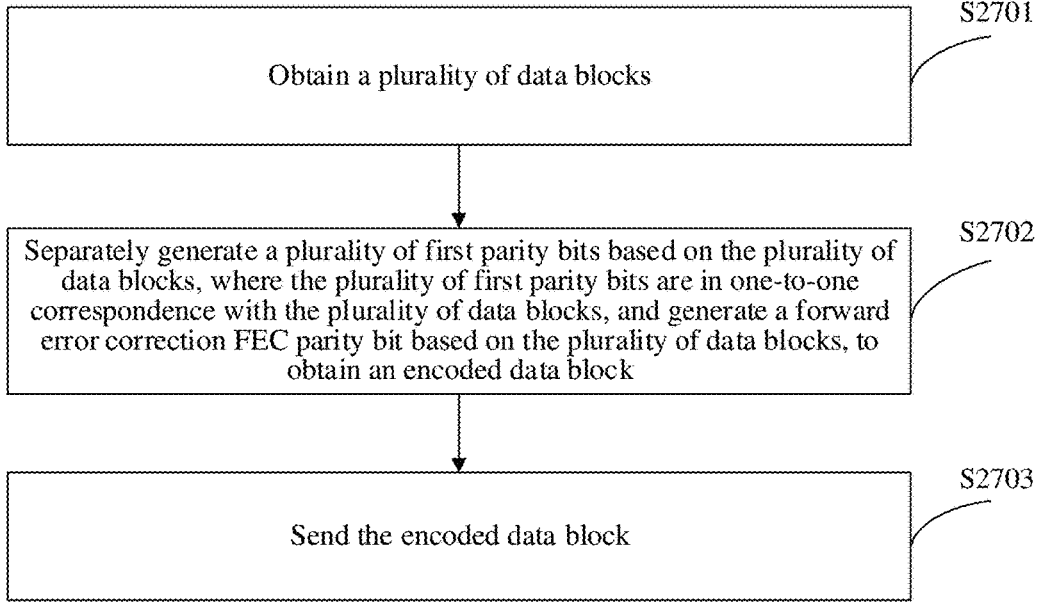
FIG. 27 is a flowchart of a sending method according to an embodiment.

FIG. 27 is a schematic flowchart of another sending method according to an embodiment. The sending method is applied to the sending apparatus 100 and includes the following steps.

S2701: Obtain a plurality of data blocks.

For obtaining the data block, a division granularity of the data block, and the like, refer to related content in steps S701, S702, and S1903. Details are not repeated herein.

S2702: Separately generate a plurality of first parity bits based on the plurality of data blocks, where the plurality of first parity bits are in one-to-one correspondence with the plurality of data blocks, and generate a forward error correction FEC parity bit based on the plurality of data blocks, to obtain an encoded data block.

It should be noted that the first parity bit herein is the foregoing Pchit parity bit. For the Pchit parity bit, refer to related content of embodiments in FIG. 7 and FIG. 19. Details are not described herein again.

In a possible embodiment, the separately generating a plurality of first parity bits based on the plurality of data blocks includes: separately encoding data of the plurality of data blocks in one or more encoding manners, to generate the plurality of first parity bits. For specific content of this embodiment, refer to a related part in step S702. Details are not described herein.

In a possible embodiment, the generating an FEC parity bit based on the plurality of data blocks includes: generating the FEC parity bit based on the plurality of data blocks and the plurality of first parity bits. For generation of the FEC parity bit, refer to related content in steps S703 and S1902. Details are not described herein.

S2703: Send the encoded data block.

For example, after performing the foregoing steps S2701 and S2702, the sending apparatus 100 may send the encoded data block to the receiving apparatus 200. Also, based on an actual transmission medium between the sending apparatus 100 and the receiving apparatus 200, the sending apparatus 100 may further convert the encoded data block into a proper transmission signal, and then send the transmission signal to the receiving apparatus 200. For example, after the sending apparatus 100 converts the encoded data block into an optical signal, and then transmits the optical signal to the receiving apparatus 200 by using an optical fiber. This is not limited.

Thus, in this embodiment, on the sending apparatus 100 side, one corresponding first parity bit is separately generated for each of a plurality of data blocks, and one corresponding FEC parity bit is generated for the plurality of data blocks. In this way, the receiving apparatus 200 can separately check, by using the plurality of first parity bits, whether an error exists in the corresponding data blocks, to predict an error in an encoded data block. In addition, a receiving end can correct an error existing in the plurality of data blocks by using the FEC parity bit. Therefore, the receiving apparatus 200 may flexibly design a decoding manner of the encoded data block. This helps reduce impact of FEC decoding on a latency and power consumption, and helps implement a low latency and a high gain.

FIG. 28 is a schematic flowchart of another receiving method according to an embodiment. The method is applied to the receiving apparatus 200 and includes the following steps.

S2801: Obtain an encoded data block, where the encoded data block includes a plurality of data blocks, a plurality of first parity bits, and an FEC parity bit, the plurality of first parity bits are in one-to-one correspondence with the plurality of data blocks, and the FEC parity bit corresponds to the plurality of data blocks.

It should be noted that the first parity bit herein refers to the foregoing Pchit parity bit. For generation of the Pchit parity bit, a division granularity of the data block, generation of the FEC parity bit, and the like, refer to related content in embodiments of FIG. 7 and FIG. 19. Details are not described herein again.

S2802: Check the corresponding data blocks based on the plurality of first parity bits and/or the FEC parity bit, to obtain a decoding result of the encoded data block.

In a possible embodiment, the checking the corresponding data blocks based on the plurality of first parity bits and/or the FEC parity bit, to obtain a decoding result of the encoded data block includes: separately checking whether an error exists in the corresponding data blocks based on the plurality of first parity bits; and performing FEC decoding on the plurality of data blocks based on the FEC parity bit when an error is detected in the plurality of data blocks, to obtain the decoding result of the encoded data block.

In a possible embodiment, the method further includes: using the plurality of data blocks as the decoding result of the encoded data block when no error is detected in the plurality of data blocks.

In a possible embodiment, the performing FEC decoding on the plurality of data blocks based on the FEC parity bit when an error is detected in the plurality of data blocks, to obtain the decoding result of the encoded data block includes: using a first data block as a decoding result of the first data block when no error is detected in the first data block, where the first data block is one of the plurality of data blocks; performing FEC decoding on the plurality of data blocks based on the FEC parity bit when an error is detected in a second data block, to obtain FEC decoded data, and using data corresponding to the second data block in the FEC decoded data as a decoding result of the second data block, where the second data block is one of the plurality of data blocks; and using decoding results of the plurality of data blocks as the decoding result of the encoded data block.

In a possible embodiment, the plurality of data blocks have a sequence. The separately checking whether an error exists in the corresponding data blocks based on the plurality of first parity bits includes: sequentially checking whether an error exists in the corresponding data blocks based on the plurality of first parity bits. The using data corresponding to the second data block in the FEC decoded data as a decoding result of the second data block includes: respectively using the data corresponding to the second data block and data corresponding to another data block following the second data block in the FEC decoded data as the decoding result of the second data block and a decoding result of the another data block following the second data block.

For specific content of the foregoing four embodiments, refer to related parts of the foregoing steps S2502 to S2504. Details are not described herein.

In a possible embodiment, the checking the corresponding data blocks based on the plurality of first parity bits and/or the FEC parity bit, to obtain a decoding result of the encoded data block includes: separately checking whether an error exists in the corresponding data blocks based on the plurality of first parity bits; performing FEC decoding on the plurality of data blocks based on the FEC parity bit, to obtain FEC decoded data; and obtaining the decoding result of the encoded data block based on the FEC decoded data when an error is detected in the plurality of data blocks.

In a possible embodiment, the separately checking, based on the plurality of first parity bits, whether an error exists in the corresponding data blocks, and the performing FEC decoding on the plurality of data blocks based on the FEC parity bit, to obtain FEC decoded data are performed in parallel.

In a possible embodiment, the checking the corresponding data blocks based on the plurality of first parity bits and/or the FEC parity bit, to obtain a decoding result of the encoded data block further includes: using the plurality of data blocks as the decoding result of the encoded data block when no error is detected in the plurality of data blocks.

In a possible embodiment, the obtaining the decoding result of the encoded data block based on the FEC decoded data when an error is detected in the plurality of data blocks includes: using a first data block as a decoding result of the first data block when no error is detected in the first data block, where the first data block is one of the plurality of data blocks; using data corresponding to a second data block in the FEC decoded data as a decoding result of the second data block when an error is detected in the second data block, where the second data block is one of the plurality of data blocks; and using decoding results of the plurality of data blocks as the decoding result of the encoded data block.

In a possible embodiment, the plurality of data blocks have a sequence. The separately checking whether an error exists in the corresponding data blocks based on the plurality of first parity bits includes: sequentially checking whether an error exists in the corresponding data blocks based on the plurality of first parity bits. The using data corresponding to the second data block in the FEC decoded data as a decoding result of the second data block includes: respectively using the data corresponding to the second data block and data corresponding to another data block following the second data block in the FEC decoded data as the decoding result of the second data block and a decoding result of the another data block following the second data block.

For specific content of the foregoing five embodiments, refer to related parts of the foregoing steps S2102 to S2105. Details are not described herein, either.

Thus, in this embodiment, on the receiving apparatus 200 side, a decoding result of an encoded data block may be obtained based on a plurality of first parity bits and/or an FEC parity bit in the encoded data block. There may be two types of solutions: starting FEC on demand and parallel error detection and correction.

In the solution of starting the FEC on demand, whether an error exists in corresponding data blocks is first checked based on the plurality of first parity bits. If no error is detected in each of the plurality of data blocks, data of the plurality of data blocks may be directly used as the decoding result of the encoded data block. If an error is detected in the plurality of data blocks (where an error is detected in at least one of the plurality of data blocks), an FEC function needs to be started, and FEC decoding is performed on the plurality of data blocks based on the FEC parity bit to obtain FEC decoded data. For a data block in which no error is detected, data of the data block may be directly used as a decoding result of the data block. For a data block in which an error is detected, data corresponding to the data block in the FEC decoded data is used as a decoding result of the data block. Then, decoding results of all the data blocks are combined as the decoding result of the encoded data block. Further, a sequence of the plurality of data blocks may be further considered, and whether an error exists in each data block is checked based on the sequence. The FEC decoding is started to obtain the FEC decoded data only when an error exists in a data block. Then, data corresponding to the data block and data corresponding to another data block following the data block in the FEC decoded data are respectively used as a decoding result of the data block and a decoding result of the another data block following the data block. Therefore, a check result of the another data block following the data block may be ignored, and the check on the another data block following the data block in the encoded data block may even be stopped, to reduce energy consumption. It may be understood that, the start of the FEC decoding and introduction of an FEC decoding latency are needed only when an error exists. Therefore, impact of the FEC decoding on a latency and power consumption can be reduced, and this helps implement a low latency and a high gain.

In the solution of parallel error detection and correction, whether an error exists in the corresponding data blocks may be separately checked based on a plurality of data blocks, and FEC decoding is performed on the plurality of data blocks based on the FEC parity bit, to obtain FEC decoded data. The foregoing error detection and error correction actions may be performed in parallel. When no error is detected in the plurality of data blocks, there is no need to wait for/use the FEC decoded data, and data of the plurality of data blocks is directly used as the decoding result of the encoded data block. When an error is detected in the plurality of data blocks, the FEC decoded data needs to be used. For a data block in which no error is detected, data of the data block may be directly used as a decoding result of the data block. For a data block in which an error is detected, data corresponding to the data block in the FEC decoded data is used as a decoding result of the data block. Then, decoding results of all the data blocks are combined as the decoding result of the encoded data block. Further, a sequence of the plurality of data blocks may also be considered herein, and the check is sequentially performed. When an error is detected in a data block, data corresponding to the data block and data corresponding to another data block following the data block in the FEC decoded data are respectively used as a decoding result of the data block and a decoding result of the another data block following the data block. Therefore, a check result of the another data block following the data block may be ignored, and the check on the another data block following the data block in the encoded data block may even be stopped. It may be understood that, the use of the FEC decoded data and introduction of an FEC decoding latency are needed only when an error exists. Therefore, impact of the FEC decoding on a latency can be reduced, and this helps implement a low latency and a high gain. In addition, an error correction capability of a high-gain FEC code is retained, and this helps control an output bit error rate.

FIG. 29 is a schematic diagram of a structure of an apparatus 2900 according to an embodiment. The apparatus 2900 includes an obtaining module 2901, a processing module 2902, and a sending module 2903.

The obtaining module 2901 is configured to obtain a plurality of data blocks.

The processing module 2902 is configured to separately generate a plurality of first parity bits based on the plurality of data blocks, where the plurality of first parity bits are in one-to-one correspondence with the plurality of data blocks, and generate a forward error correction FEC parity bit based on the plurality of data blocks, to obtain an encoded data block.

The sending module 2903 is configured to send the encoded data block.

In a possible embodiment, the separately generating a plurality of first parity bits based on the plurality of data blocks includes: separately encoding data of the plurality of data blocks in one or more encoding manners, to generate the plurality of first parity bits.

In a possible embodiment, the generating an FEC parity bit based on the plurality of data blocks includes: generating the FEC parity bit based on the plurality of data blocks and the plurality of first parity bits.

The apparatus 2900 may correspond to the sending apparatus 100 in the communication system in FIG. 1, and is configured to implement an embodiment of the sending method in FIG. 7, FIG. 19, or FIG. 27. For details, refer to the foregoing related descriptions. Details are not described herein again.

It should be noted that the apparatus 2900 provided in an embodiment in FIG. 29 is described only by using division of the foregoing functional modules/units as an example. In actual application, the foregoing functions may be allocated to different functional modules/units for implementation on demand. In other words, an internal structure of the apparatus 2900 is divided into different functional modules/units to implement all or some of the functions described above.

FIG. 30 is a schematic diagram of a structure of an apparatus 3000 according to an embodiment. The apparatus 3000 includes an obtaining module 3001 and a processing module 3002.

The obtaining module 3001 is configured to obtain an encoded data block, where the encoded data block includes a plurality of data blocks, a plurality of first parity bits, and an FEC parity bit, the plurality of first parity bits are in one-to-one correspondence with the plurality of data blocks, and the FEC parity bit corresponds to the plurality of data blocks.

The processing module 3002 is configured to check the corresponding data blocks based on the plurality of first parity bits and/or the FEC parity bit, to obtain a decoding result of the encoded data block.

In a possible embodiment, the checking the corresponding data blocks based on the plurality of first parity bits and/or the FEC parity bit, to obtain a decoding result of the encoded data block includes: separately checking whether an error exists in the corresponding data blocks based on the plurality of first parity bits; and performing FEC decoding on the plurality of data blocks based on the FEC parity bit when an error is detected in the plurality of data blocks, to obtain the decoding result of the encoded data block.

In a possible embodiment, the processing module 3002 is further configured to use the plurality of data blocks as the decoding result of the encoded data block when no error is detected in the plurality of data blocks. It should be noted that, in the embodiments, if no error is detected in any one of the plurality of data blocks, in other words, no error is detected in each of the plurality of data blocks, it indicates that "no error is detected in the plurality of data blocks". If an error is detected in at least one of the plurality of data blocks, it indicates that "an error is detected in the plurality of data blocks".

In a possible embodiment, the performing FEC decoding on the plurality of data blocks based on the FEC parity bit when an error is detected in the plurality of data blocks, to obtain the decoding result of the encoded data block includes: using a first data block as a decoding result of the first data block when no error is detected in the first data block, where the first data block is one of the plurality of data blocks; performing FEC decoding on the plurality of data blocks based on the FEC parity bit when an error is detected in a second data block, to obtain FEC decoded data, and using data corresponding to the second data block in the FEC decoded data as a decoding result of the second data block, where the second data block is one of the plurality of data blocks; and using decoding results of the plurality of data blocks as the decoding result of the encoded data block.

In a possible embodiment, the plurality of data blocks have a sequence. The separately checking whether an error exists in the corresponding data blocks based on the plurality of first parity bits includes: sequentially checking whether an error exists in the corresponding data blocks based on the plurality of first parity bits. The using data corresponding to the second data block in the FEC decoded data as a decoding result of the second data block includes: respectively using the data corresponding to the second data block and data corresponding to another data block following the second data block in the FEC decoded data as the decoding result of the second data block and a decoding result of the another data block following the second data block.

In a possible embodiment, the checking the corresponding data blocks based on the plurality of first parity bits and/or the FEC parity bit, to obtain a decoding result of the encoded data block includes: separately checking whether an error exists in the corresponding data blocks based on the plurality of first parity bits; performing FEC decoding on the plurality of data blocks based on the FEC parity bit, to obtain FEC decoded data; and obtaining the decoding result of the encoded data block based on the FEC decoded data when an error is detected in the plurality of data blocks.

In a possible embodiment, the separately checking, based on the plurality of first parity bits, whether an error exists in the corresponding data blocks, and the performing FEC decoding on the plurality of data blocks based on the FEC parity bit, to obtain FEC decoded data are performed in parallel.

In a possible embodiment, after the separately checking, based on the plurality of first parity bits, whether an error exists in the corresponding data blocks, the processing module 3002 is further configured to: use the plurality of data blocks as the decoding result of the encoded data block when no error is detected in the plurality of data blocks.

In a possible embodiment, the obtaining the decoding result of the encoded data block based on the FEC decoded data when an error is detected in the plurality of data blocks includes: using a first data block as a decoding result of the first data block when no error is detected in the first data block, where the first data block is one of the plurality of data blocks; using data corresponding to the second data block in the FEC decoded data as a decoding result of the second data block when an error is detected in the second data block, where the second data block is one of the plurality of data blocks; and using decoding results of the plurality of data blocks as the decoding result of the encoded data block.

In a possible embodiment, the plurality of data blocks have a sequence. The separately checking whether an error exists in the corresponding data blocks based on the plurality of first parity bits includes: sequentially checking whether an error exists in the corresponding data blocks based on the plurality of first parity bits. The using data corresponding to the second data block in the FEC decoded data as a decoding result of the second data block includes: respectively using the data corresponding to the second data block and data corresponding to another data block following the second data block in the FEC decoded data as the decoding result of the second data block and a decoding result of the another data block following the second data block.

The apparatus 3000 may correspond to the receiving apparatus 200 in the communication system in FIG. 1, and is configured to implement an embodiment of the receiving method in FIG. 21, FIG. 25, or FIG. 28. For details, refer to the foregoing related descriptions. Details are not described herein again.

It should be noted that, the apparatus 3000 provided in an embodiment in FIG. 30 is described only by using division of the foregoing functional modules/units as an example. In actual application, the foregoing functions may be allocated to different functional modules/units for implementation on demand. In other words, an internal structure of the apparatus 3000 is divided into different functional modules/units to implement all or some of the functions described above.

Figure 31:
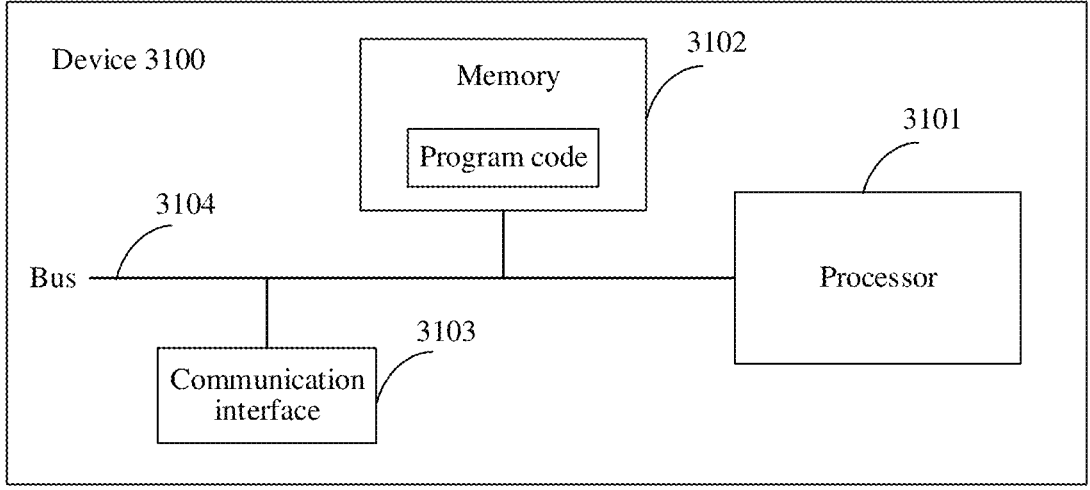
FIG. 31 is a schematic diagram of a structure of a device according to an embodiment.

FIG. 31 is a schematic diagram of a structure of a device 3100 according to an embodiment. The device 3100 may be a device such as a notebook computer, a tablet computer, or a cloud server. This is not limited.

The device 3100 includes a processor 3101, a memory 3102, and a communication interface 3103, and the device 3100 is configured to implement any embodiment of the sending method in FIG. 7, FIG. 19, or FIG. 17. The processor 3101, the memory 3102, and the communication interface 3103 may be connected to each other through an internal bus 3104, or may implement communication by using another manner, such as wireless transmission. In this embodiment, an example in which the bus 3104 is used for the connection is used. The bus 3104 may be a peripheral component interconnect (PCI) bus, an extended industry standard architecture (EISA) bus, a unified bus (Ubus or UB), a compute express link (CXL) bus, a cache coherent interconnect for accelerators (CCIX) bus, or the like. The bus 3104 may be divided into an address bus, a data bus, a control bus, and the like. For ease of representation, the bus is represented by using only one bold line in FIG. 31. However, it does not indicate that there is only one bus or only one type of bus.

The processor 3101 may include at least one general-purpose processor, for example, a central processing unit (CPU), or a combination of a CPU and a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. The processor 3101 executes various types of digital storage instructions, for example, software or firmware programs stored in the memory 3102, so that the device 3100 can provide various services.

The memory 3102 is configured to store program code, and the processor 3101 controls execution of the program code. The memory 3102 may include a volatile memory, for example, a random access memory (RAM). The memory 3102 may also include a non-volatile memory, for example, a read-only memory (ROM), a flash memory, a hard disk drive (HDD), or a solid-state drive (SSD). The memory 3102 may further include a combination of the foregoing types. The memory 3102 may store program code, and may include program code used to perform any embodiment of the sending method in FIG. 7, FIG. 19, or FIG. 27. Details are not described herein again.

The communication interface 3103 may be a wired interface (for example, an Ethernet interface), or may be an internal interface (for example, a high-speed serial computer expansion bus (PCIe) bus interface), a wired interface (for example, an Ethernet interface), or a wireless interface (for example, a cellular network interface or a wireless local area network interface), and is configured to communicate with another device or module.

The device 3100 may be used in the communication system architecture shown in FIG. 1, for example, may be the sending apparatus 100 in FIG. 1, and is configured to perform the sending method in FIG. 7, FIG. 19, or FIG. 27.

It should be noted that this embodiment may be implemented by a general-purpose physical server, for example, an ARM server or an X86 server, or may be implemented by a virtual machine that is implemented based on a general-purpose physical server in combination with an NFV technology. A virtual machine is a software-stimulated complete computer system that has a function of a complete hardware system and operates in a fully isolated environment. This is not limited. It should be understood that the device 3100 shown in FIG. 31 may alternatively be a server cluster including at least one server. This is not limited.

It should be further noted that FIG. 31 shows merely a possible implementation of this embodiment. In actual application, the device 3100 may further include more or fewer components. This is not limited. For content that is not presented or described in this embodiment, refer to related descriptions in an embodiment of the sending method in FIG. 7, FIG. 19, or FIG. 27. Details are not described herein again.

Figure 32:
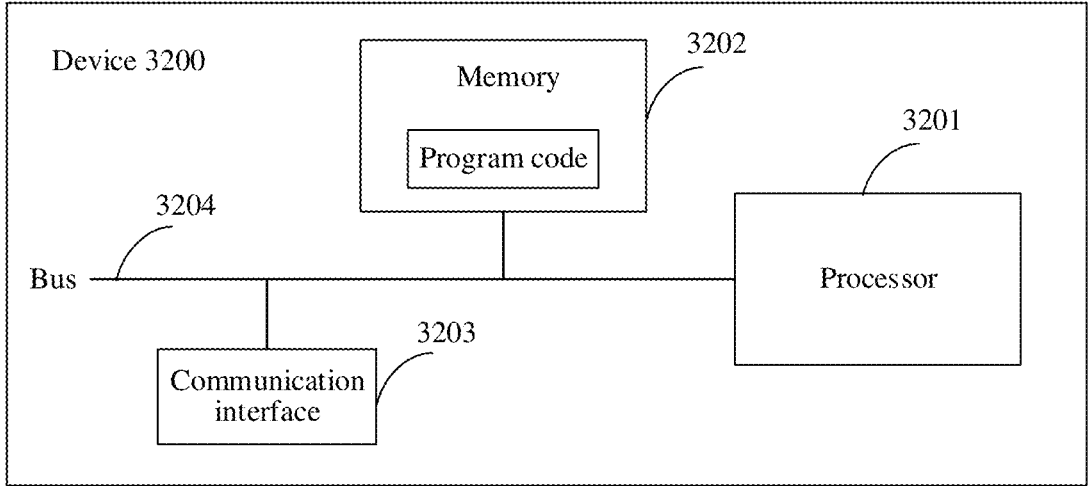
FIG. 32 is a schematic diagram of a structure of another device according to an embodiment.

FIG. 32 is a schematic diagram of a structure of a device 3200 according to an embodiment. The device 3200 may be a device such as a notebook computer, a tablet computer, or a cloud server. This is not limited.

The device 3200 includes a processor 3201, a memory 3202, and a communication interface 3203, and the device 3200 is configured to implement any embodiment of the receiving method in FIG. 21, FIG. 25, or FIG. 28. The processor 3201, the memory 3202, and the communication interface 3203 may be connected to each other through an internal bus 3204, or may implement communication by using another manner, such as wireless transmission. In this embodiment, an example in which the bus 3204 is used for the connection is used. The bus 3204 may be a peripheral component interconnect (PCI) bus, an extended industry standard architecture (EISA) bus, a unified bus (Ubus or UB), a compute express link (CXL) bus, a cache coherent interconnect for accelerators (CCIX) bus, or the like. The bus 3204 may be divided into an address bus, a data bus, a control bus, and the like. For ease of representation, the bus is represented by using only one bold line in FIG. 32. However, it does not indicate that there is only one bus or only one type of bus.

The processor 3201 may include at least one general-purpose processor, for example, a central processing unit (CPU), or a combination of a CPU and a hardware chip. The hardware chip may be an application-specific integrated circuit (ASIC), a programmable logic device (PLD), or a combination thereof. The PLD may be a complex programmable logic device (CPLD), a field-programmable gate array ( ), generic array logic (GAL), or any combination thereof. The processor 3201 executes various types of digital storage instructions, for example, software or firmware programs stored in the memory 3202, so that the device 3200 can provide various services.

The memory 3202 is configured to store program code, and the processor 3201 controls execution of the program code. The memory 3202 may include a volatile memory, for example, a random access memory (RAM). The memory 3202 may also include a non-volatile memory, for example, a read-only memory (ROM), a flash memory, a hard disk drive (HDD), or a solid-state drive (SSD). The memory 3202 may further include a combination of the foregoing types. The memory 3202 may store program code, and may include program code used to perform any embodiment of the receiving method in FIG. 21, FIG. 25, or FIG. 28. Details are not described herein again.

The communication interface 3203 may be a wired interface (for example, an Ethernet interface), or may be an internal interface (for example, a high-speed serial computer expansion bus (PCIe) bus interface), a wired interface (for example, an Ethernet interface), or a wireless interface (for example, a cellular network interface or a wireless local area network interface), and is configured to communicate with another device or module.

The device 3200 may be used in the communication system architecture shown in FIG. 1, for example, may be the receiving apparatus 200 in FIG. 1, and is configured to perform the receiving method in FIG. 21, FIG. 25, or FIG. 28.

It should be noted that this embodiment may be implemented by a general-purpose physical server, for example, an ARM server or an X86 server, or may be implemented by a virtual machine that is implemented based on a general-purpose physical server in combination with an NFV technology. A virtual machine is a software-stimulated complete computer system that has a function of a complete hardware system and operates in a fully isolated environment. This is not limited. It should be understood that the device 3200 shown in FIG. 32 may alternatively be a server cluster including at least one server. This is not limited.

It should be further noted that FIG. 32 shows merely a possible implementation of this embodiment. In actual application, the device 3200 may further include more or fewer components. This is not limited. For content that is not presented or described in this embodiment of this application, refer to related descriptions in an embodiment of the sending method in FIG. 21, FIG. 25, or FIG. 28. Details are not described herein again.

An embodiment further provides a system, including the apparatus 2900 in any one of the foregoing embodiments and the apparatus 3000 in any one of the foregoing embodiments.

An embodiment further provides a system, including the device 3100 in any one of the foregoing embodiments and the device 3200 in any one of the foregoing embodiments.

An embodiment further provides a chip. The chip is configured to perform the method in any embodiment in FIG. 27 or FIG. 28.

An embodiment further provides a non-transitory computer-readable storage medium. The non-transitory computer-readable storage medium stores instructions. When the instructions are run on a processor, the method in any embodiment in FIG. 27 or FIG. 28 is implemented.

An embodiment further provides a computer program product. When the computer program product runs on a processor, the method in any embodiment in FIG. 27 or FIG. 28 is implemented.

A person of ordinary skill in the art may understand that all or some of the processes of the methods in embodiments may be implemented by a computer program instructing relevant hardware. The program may be stored in a non-transitory computer-readable storage medium. When the program runs, the processes of the methods in embodiments are performed. The storage medium may include: a magnetic disk, an optical disc, a read-only memory (ROM), or a random access memory (RAM).

It should be noted that the embodiments described above are only a part rather than all of embodiments. All other embodiments obtained by a person of ordinary skill in the art based on embodiments without creative efforts shall fall within the scope of the embodiments.

It should be further noted that the terms used in embodiments are merely for the purpose of illustrating specific embodiments, and are not intended as limiting. The terms "a", "the", and "this" of singular forms used in embodiments are also intended to include plural forms, unless otherwise specified in the context clearly. It should also be understood that the term "and/or" used herein indicates any or all possible combinations of one or more associated listed items.

What is claimed is:

1. A method, comprising:
obtaining a plurality of data blocks;
separately generating a plurality of first parity bit groups based on the plurality of data blocks, wherein the plurality of first parity bit groups are in a one-to-one correspondence with the plurality of data blocks, and wherein separately generating the plurality of first parity bit groups based on the plurality of data blocks further comprises separately encoding data of the plurality of data blocks in a plurality of encoding manners to generate the plurality of first parity bit groups;
generating a forward error correction (FEC) parity bit group based on the plurality of data blocks to obtain an encoded data block; and
sending the encoded data block.

2. The method according to claim 1, wherein generating the FEC parity bit group based on the plurality of data blocks further comprises:
generating the FEC parity bit group based on the plurality of data blocks and the plurality of first parity bit groups.

3. A method comprising:
obtaining an encoded data block, wherein the encoded data block comprises a plurality of data blocks, a plurality of first parity bit groups, and a forward error correction (FEC) parity bit group, wherein the plurality of first parity bit groups are generated by separately encoding data of the plurality of data blocks in a plurality of encoding manners and are in a one-to-one correspondence with the plurality of data blocks, and the FEC parity bit group corresponds to the plurality of data blocks; and
checking the corresponding data blocks based on the plurality of first parity bit groups and/or the FEC parity bit group to obtain a decoding result of the encoded data block.

4. The method according to claim 3, wherein checking the corresponding data blocks based on the plurality of first parity bit groups and/or the FEC parity bit group to obtain the decoding result of the encoded data block further comprises:
separately checking, based on the plurality of first parity bit groups, whether an error exists in the corresponding data blocks; and
performing FEC decoding on the plurality of data blocks based on the FEC parity bit group when an error is detected in the plurality of data blocks to obtain the decoding result of the encoded data block.

5. The method according to claim 4, further comprising:
using the plurality of data blocks as the decoding result of the encoded data block when no error is detected in the plurality of data blocks.

6. The method according to claim 4, wherein performing the FEC decoding on the plurality of data blocks based on the FEC parity bit group when the error is detected in the plurality of data blocks to obtain the decoding result of the encoded data block further comprises:
using a first data block as a decoding result of the first data block when no error is detected in the first data block, wherein the first data block is one of the plurality of data blocks;

performing FEC decoding on the plurality of data blocks based on the FEC parity bit group when an error is detected in a second data block to obtain FEC decoded data;

using data corresponding to the second data block in the FEC decoded data as a decoding result of the second data block, wherein the second data block is one of the plurality of data blocks; and using decoding results of the plurality of data blocks as the decoding result of the encoded data block.

7. The method according to claim 6, wherein the plurality of data blocks has a sequence and separately checking, based on the plurality of first parity bit groups, whether the error exists in the corresponding data blocks further comprises:

sequentially checking, based on the plurality of first parity bit groups, whether the error exists in the corresponding data blocks; and using data corresponding to the second data block in the FEC decoded data as the decoding result of the second data block further comprises:

respectively using the data corresponding to the second data block and data corresponding to another data block following the second data block in the FEC decoded data as the decoding result of the second data block and a decoding result of the another data block following the second data block.

8. The method according to claim 3, wherein checking the corresponding data blocks based on the plurality of first parity bit groups and/or the FEC parity bit group to obtain the decoding result of the encoded data block further comprises:

separately checking, based on the plurality of first parity bit groups, whether an error exists in the corresponding data blocks;

performing FEC decoding on the plurality of data blocks based on the FEC parity bit group to obtain FEC decoded data; and obtaining the decoding result of the encoded data block based on the FEC decoded data when an error is detected in the plurality of data blocks.

9. The method according to claim 8, wherein separately checking, based on the plurality of first parity bit groups, whether the error exists in the corresponding data blocks, and performing the FEC decoding on the plurality of data blocks based on the FEC parity bit group to obtain the FEC decoded data are performed in parallel.

10. The method according to claim 8, further comprising:

using the plurality of data blocks as the decoding result of the encoded data block when no error is detected in the plurality of data blocks.

11. The method according to claim 8, wherein obtaining the decoding result of the encoded data block based on the FEC decoded data when the error is detected in the plurality of data blocks further comprises:

using a first data block as a decoding result of the first data block when no error is detected in the first data block, wherein the first data block is one of the plurality of data blocks;

using data corresponding to a second data block in the FEC decoded data as a decoding result of the second data block when an error is detected in the second data block, wherein the second data block is one of the plurality of data blocks; and using decoding results of the plurality of data blocks as the decoding result of the encoded data block.

12. The method according to claim 11, wherein the plurality of data blocks has a sequence and separately checking, based on the plurality of first parity bit groups, whether the error exists in the corresponding data blocks further comprises:

sequentially checking, based on the plurality of first parity bit groups, whether the error exists in the corresponding data blocks; and using the data corresponding to the second data block in the FEC decoded data as the decoding result of the second data block further comprises:

respectively using the data corresponding to the second data block and data corresponding to another data block following the second data block in the FEC decoded data as the decoding result of the second data block and a decoding result of the another data block following the second data block.

13. An apparatus comprising:

an obtaining circuit configured to obtain a plurality of data blocks;

a processing circuit configured to separately generate a plurality of first parity bit groups based on the plurality of data blocks, wherein the plurality of first parity bit groups are in a one-to-one correspondence with the plurality of data blocks, and generate a forward error correction (FEC) parity bit group based on the plurality of data blocks to obtain an encoded data block, and wherein separately generating the plurality of first parity bit groups based on the plurality of data blocks further comprises separately encoding data of the plurality of data blocks in a plurality of encoding manners to generate the plurality of first parity bit groups; and a sending circuit configured to send the encoded data block.

14. The apparatus according to claim 13, wherein generating the FEC parity bit group based on the plurality of data blocks further comprises:

generating the FEC parity bit group based on the plurality of data blocks and the plurality of first parity bit groups.

15. An apparatus comprising:

an obtaining circuit configured to obtain an encoded data block, wherein the encoded data block comprises a plurality of data blocks, a plurality of first parity bit groups, and a forward error correction (FEC) parity bit group, wherein the plurality of first parity bit groups are generated by separately encoding data of the plurality of data blocks in a plurality of encoding manners and are in a one-to-one correspondence with the plurality of data blocks, and the FEC parity bit group corresponds to the plurality of data blocks; and a processing circuit configured to check the corresponding data blocks based on the plurality of first parity bit groups and/or the FEC parity bit group to obtain a decoding result of the encoded data block.

16. The apparatus according to claim 15, wherein checking the corresponding data blocks based on the plurality of first parity bit groups and/or the FEC parity bit group, to obtain the decoding result of the encoded data block further comprises:

separately checking, based on the plurality of first parity bit groups, whether an error exists in the corresponding data blocks; and performing FEC decoding on the plurality of data blocks based on the FEC parity bit group when an error is detected in the plurality of data blocks to obtain the decoding result of the encoded data block.

17. The apparatus according to claim 16, wherein the processing circuit is further configured to use the plurality of data blocks as the decoding result of the encoded data block when no error is detected in the plurality of data blocks.

18. The apparatus according to claim 16, wherein performing the FEC decoding on the plurality of data blocks based on the FEC parity bit group when the error is detected in the plurality of data blocks to obtain the decoding result of the encoded data block, further comprises:

using a first data block as a decoding result of the first data block when no error is detected in the first data block, wherein the first data block is one of the plurality of data blocks;

performing FEC decoding on the plurality of data blocks based on the FEC parity bit group when an error is detected in a second data block to obtain FEC decoded data;

using data corresponding to the second data block in the FEC decoded data as a decoding result of the second data block, wherein the second data block is one of the plurality of data blocks; and using decoding results of the plurality of data blocks as the decoding result of the encoded data block.

19. The apparatus according to claim 18, wherein the plurality of data blocks has a sequence and separately checking, based on the plurality of first parity bit groups, whether the error exists in the corresponding data blocks further comprises:

sequentially checking, based on the plurality of first parity bit groups, whether the error exists in the corresponding data blocks and using the data corresponding to the second data block in the FEC decoded data as the decoding result of the second data block further comprises:

respectively using the data corresponding to the second data block and data corresponding to another data block following the second data block in the FEC decoded data as the decoding result of the second data block and a decoding result of the another data block following the second data block.

20. The apparatus according to claim 15, wherein checking the corresponding data blocks based on the plurality of first parity bit groups and/or the FEC parity bit group, to obtain the decoding result of the encoded data block, further comprises:

separately checking, based on the plurality of first parity bit groups, whether an error exists in the corresponding data blocks;

performing FEC decoding on the plurality of data blocks based on the FEC parity bit group to obtain FEC decoded data; and obtaining the decoding result of the encoded data block based on the FEC decoded data when an error is detected in the plurality of data blocks.

21. The apparatus according to claim 20, wherein separately checking, based on the plurality of first parity bit groups, whether the error exists in the corresponding data blocks, and performing the FEC decoding on the plurality of data blocks based on the FEC parity bit group to obtain the FEC decoded data are performed in parallel.

22. The apparatus according to claim 20, wherein the processing circuit is further configured to use the plurality of data blocks as the decoding result of the encoded data block when no error is detected in the plurality of data blocks.

23. The apparatus according to claim 20, wherein obtaining the decoding result of the encoded data block based on the FEC decoded data when the error is detected in the plurality of data blocks further comprises:

using a first data block as a decoding result of the first data block when no error is detected in the first data block, wherein the first data block is one of the plurality of data blocks;

using data corresponding to a second data block in the FEC decoded data as a decoding result of the second data block when an error is detected in the second data block, wherein the second data block is one of the plurality of data blocks; and using decoding results of the plurality of data blocks as the decoding result of the encoded data block.

24. The apparatus according to claim 23, wherein the plurality of data blocks has a sequence and separately checking, based on the plurality of first parity bit groups, whether the error exists in the corresponding data blocks further comprises:

sequentially checking, based on the plurality of first parity bit groups, whether the error exists in the corresponding data blocks and using the data corresponding to the second data block in the FEC decoded data as the decoding result of the second data block further comprises:

respectively using the data corresponding to the second data block and data corresponding to another data block following the second data block in the FEC decoded data as the decoding result of the second data block and a decoding result of the another data block following the second data block.

* * * * *